United States Patent
Vuornos et al.

(10) Patent No.: US 9,603,059 B2
(45) Date of Patent: Mar. 21, 2017

(54) TECHNIQUES AND SYSTEMS FOR ON-DEMAND CUSTOMIZED MOBILE DATA SERVICES

(71) Applicant: Facebook, Inc., Menlo Park, CA (US)

(72) Inventors: Lauri Jaakko Vuornos, Helsinki (FI); Joonas Emil Hjelt, Helsinki (FI)

(73) Assignee: FACEBOOK, INC., Menlo Park, CA (US)

( * ) Notice: Subject to any disclaimer, the term of this patent is extended or adjusted under 35 U.S.C. 154(b) by 9 days.

(21) Appl. No.: 14/752,456

(22) Filed: Jun. 26, 2015

(65) Prior Publication Data

US 2016/0381603 A1    Dec. 29, 2016

(51) Int. Cl.
| | | |
|---|---|---|
| H04W 72/00 | (2009.01) | |
| H04W 28/20 | (2009.01) | |
| H04L 12/14 | (2006.01) | |
| H04M 15/00 | (2006.01) | |
| H04W 4/24 | (2009.01) | |

(52) U.S. Cl.
CPC ......... *H04W 28/20* (2013.01); *H04L 12/1432* (2013.01); *H04M 15/43* (2013.01); *H04W 4/24* (2013.01)

(58) Field of Classification Search
CPC ....... H04W 28/20; H04W 15/43; H04W 4/24; H04W 12/1432
USPC ....... 455/404.2, 406, 410–411, 412.1–414.2, 455/418–422.1, 566, 466, 550.1, 455/456.1–457
See application file for complete search history.

(56) References Cited

U.S. PATENT DOCUMENTS

| | | | | |
|---|---|---|---|---|
| 6,052,594 A * | 4/2000 | Chuang | ................. | H04L 5/0044 370/330 |
| 6,097,733 A * | 8/2000 | Basu | ................. | H04L 29/06027 370/329 |
| 6,388,999 B1 * | 5/2002 | Gorsuch | ................. | H04J 13/16 370/320 |
| 6,967,921 B1 * | 11/2005 | Levy | ................. | H04L 12/5695 370/230 |
| 7,072,307 B2 * | 7/2006 | Tong | ................. | H04L 1/0002 370/253 |
| 7,116,682 B1 * | 10/2006 | Waclawsky | ........... | H04J 3/1682 370/468 |
| 7,747,255 B2 * | 6/2010 | Dacosta | .............. | H04L 41/0896 370/395.41 |
| 2009/0059791 A1 * | 3/2009 | Saxena | ............... | H04L 41/0896 370/235 |
| 2009/0068984 A1 * | 3/2009 | Burnett | ................. | H04M 1/663 455/408 |
| 2010/0099393 A1 * | 4/2010 | Brisebois | .............. | H04W 48/16 455/418 |

(Continued)

*Primary Examiner* — Babar Sarwar

(57) ABSTRACT

Techniques for generating and providing on-demand customized mobile data services are described. A technique may include receiving application usage data at a data package service; analyzing the application usage data to obtain analyzed data; designing one or more data service packages according to the analyzed data, each data service package to define a set of parameters to manage access to a cellular data network; presenting one or more data service packages to a client device; receiving a selection of a data service package from the client device; and uploading a policy associated with the selected data service package to a data access server. Other embodiments are described and claimed.

17 Claims, 18 Drawing Sheets

(56) References Cited

U.S. PATENT DOCUMENTS

| | | | |
|---|---|---|---|
| 2012/0196566 A1* | 8/2012 | Lee | H04M 15/80 455/408 |
| 2013/0246213 A1* | 9/2013 | Lee | G06Q 30/0283 705/26.4 |
| 2014/0089068 A1* | 3/2014 | Yehezkel | G06Q 30/02 705/14.19 |
| 2014/0179266 A1* | 6/2014 | Schultz | H04W 4/24 455/406 |

* cited by examiner

TECHNIQUES AND SYSTEMS FOR ON-DEMAND CUSTOMIZED MOBILE DATA SERVICES

RELATED APPLICATIONS

This application is related to co-owned and concurrently filed application Ser. No. 14/752,430, entitled "Techniques and Systems for Enforcement of On-Demand Customized Mobile Data Services," the content of which is incorporated herein in its entirety.

BACKGROUND

Users of mobile devices may need to send and receive data over a network in order to use the applications ("apps") on the devices. Many users may not have consistent or persistent connections to a network such as a Wi-Fi network or a data network provided by a cellular system. These users may purchase temporary connectivity to data services, for example, for a limited amount of data transfer, or a limited amount of time of data transfer. Users may not understand how much network data their apps use, or which apps are using network data. Users may have few choices among temporary data service plans, and those choices may not align with the data needs of the user. The purchasing process for these plans may be cumbersome or inconvenient.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques and systems for on-demand customized mobile data services. Some embodiments are particularly directed to techniques for using data about app and network usage on mobile devices to generate customized data service packages. The data service packages can be offered for sale when needed at the mobile device. In one embodiment, for example, a method may comprise receiving application usage data at a data package service; analyzing the application usage data to obtain analyzed data; designing one or more data service packages according to the analyzed data, each data service package to define a set of parameters to manage access to a cellular data network; presenting one or more data service packages to a client device; receiving a selection of a data service package from the client device; and uploading a policy associated with the selected data service package to a data access server. In another embodiment, a method may comprise receiving a network data packet from a client device; determining an originating application and a data end point from the network data packet; determining whether a policy in a policy store allows the client device to access a cellular data network; and forwarding the network data packet to the data end point on the cellular data network when a policy does allow the access. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
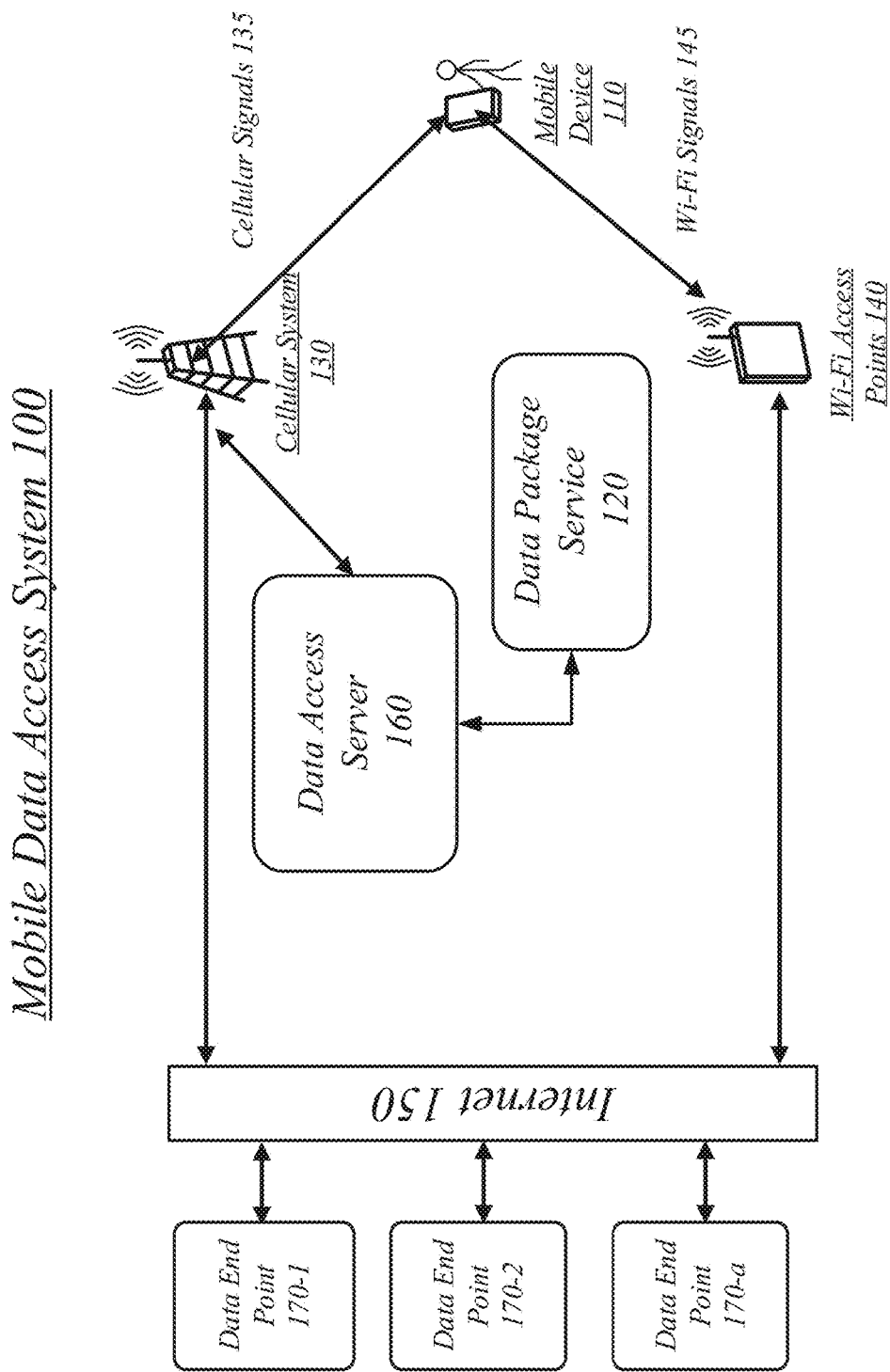
FIG. 1 illustrates an embodiment of a mobile data access system.

Various embodiments are directed to providing a customized set of data service packages to users who wish to transmit and receive network data with their mobile devices. These users may not have a consistent or persistent connection to a data service, for example, through a cellular service operator. The embodiments are further directed to enforcing access to data services according to the data service packages that a user purchases.

For mobile device users without a persistent data service contract with a cellular service provider, obtaining access to data service can be challenging. For example, some cellular service operators sell their data services through their own Point-of-Sales systems and Internet pages, which may require the user to purchase data services by using a device other than their mobile device, or to purchase by simple message service (SMS), calling the cellular service operator, or using USSD menus from their mobile devices.

Some operators may sell data services according to amounts of data allowed to be transferred, or speed of data transfer, without taking into account how an individual user actually uses data on their device. Unlimited data plans can be cost-prohibitive for some users. Further, users may not be aware of, or understand, how their mobile devices use data services, or which apps use data services.

Operator-provided data service plans may in some cases require changes to the operator network, which may be complicated, become expensive and take a lot of time. A cellular service operator may be able to provide data plans for apps, however, this capability may require dedicated systems on the operator side, and hard coding the prices to the operator. The operator also typically lacks visibility into how its users and potential users interact with their devices and use data. While the operator may see what data end points are being accessed, the operator may not know which app originated the data access. Any app-related data plans may therefore be limited in scope and/or inflexible to frequently changing data needs.

Accordingly, embodiments may provide a system that receives data about how users interact with their mobile devices, and in particular how the mobile devices and the apps executing on them use network data. The system of the embodiments may use that data to generate data service packages that take into account how an individual user accesses data with their mobile device. The data service packages can be selected and presented to the user on an as-needed basis, tailored to the user's needs. The system of the embodiments may further enable and enforce a mobile device's access to data services through the use of policies associated with the data service packages. The embodiments may operate without having to change the operator's network or the mobile devices.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a mobile data access system 100. In one embodiment, the mobile data access system 100 may comprise a computer-implemented system having software applications comprising one or more components. Although the mobile data access system 100 shown in FIG. 1 has a limited number of elements in a certain topology, it may be appreciated that the mobile data access system 100 may include more or fewer elements in alternate topologies as desired for a given implementation.

As shown in FIG. 1, a mobile device 110 may access various data end points 170-1, 170-2, 170-a via the Internet 150. The mobile device 110 may connect to the Internet 150 and to the data end points 170 by performing various operations using network data accessed over a network. The mobile device 110 may access a cellular system 130 using cellular signals 135. The cellular system 130 may be a cellular network that provides access to both a voice telephone service and a cellular data network. The cellular system 130 may be provided by a cellular service operator from which the user of the mobile device 110 has purchased a data service package. A data service package may allow the mobile device 110 to transmit and receive data using the cellular system 130 within some defined parameters. In some cases, the mobile device 130 may be able to transmit and receive data using the cellular system 130 without having a purchased data service package, for example, when the cellular service operator designates certain data transfers to be free of charge, e.g. "zero-rated." The mobile device 110 may use the cellular system 130 to access the public Internet 150 and/or the data end points 170.

The mobile device 110 may access one or more Wi-Fi access points 140 using Wi-Fi signals 145. Wi-Fi access points 140 may be provided by a plurality of different operators. Some of the Wi-Fi access points 140 may be personal in nature, such as a home Wi-Fi network operated by the user of mobile device 110 based on a domestic Internet connection. Some of the Wi-Fi access points 140 may be free of charge or provided as a complimentary portion of a service, such as free Wi-Fi service in coffee shops, hotels, and other public accommodations. The mobile device 110 may use Wi-Fi access points 140 to access the public Internet 150.

The mobile device 110 may communicate with other devices using wireless transmissions to exchange network traffic. Exchanging network traffic may comprise transmitting and receiving network traffic via a network interface controller (NIC). A NIC comprises a hardware component connecting a computer device, such as mobile device 110, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API).

The mobile device 110 may have one or more software applications, referred to herein as "apps", that provide various functions when executed on the mobile device 110. Apps may provide, for example, and without limitation, games, communications, navigation, Internet browsing, social networking, video players, audio players, references, and so forth. Some apps may access one or more data end points 170 as part of their operations. The mobile device 110 is described in further detail below.

A data end point 170 may include any network destination or source of data. A data end point 170 may include, for example and without limitation, an Internet protocol (IP) address, a website uniform resource locator (URL), a port number, a server, a database, a host, another mobile device, another computing device, and so forth.

The mobile data access system 100 may include a data package service 120. The data package service 120 may collect data from a plurality of mobile devices about how apps and/or network data are used on the mobile devices. The data may include, for example, and without limitation, what apps are executed on a mobile device, what sequences of apps are executed, how much data an app uses, times of day that an app is used, frequency and/or duration of an app's use, data end points accessed by an app, and so forth.

The data package service 120 may use the data to generate a plurality of data service packages. A data service package may provide, when purchased by a user, access to a cellular data network subject to various parameters. For example, the data service package may limit access to the cellular data network to a time period, e.g. 24 hours, and/or to a data amount, e.g. 1 GB of data. A data service package may apply to a specific app on a mobile device, to a set of apps, to a type of data, e.g. video or audio, and so forth.

The data package service 120 may select data service packages to present to a mobile device when an app on the mobile device is attempting to access a data end point 170, in real time. When a data service package is selected by the user, the data package service 120 may coordinate payment for the data service package and may transmit a policy to a data access server 160 that includes the parameters of the data service package for access to the cellular data network. The data package service 120 is discussed in further detail below.

The mobile data access system 100 may include a data access server 160. The data access server 160 may enforce and control access to a cellular data network by a mobile device. The data access server 160 may receive all network packets from a mobile device 110 that are directed to the cellular system 130. The data access server 160 may determine whether a policy exists for the mobile device and/or the app that originated the network packet. When a policy exists, the data access server 160 may send the network packet to its data end point 170 via the cellular system 130. When no policy exists, the data access server 160 may prompt the data package service 120 to select data service packages to offer for sale to the user of the mobile device 110. The data access server 160 is described in further detail below.

The mobile data access system 100 may include an authorization server (or other suitable component(s)) that allows users to opt in to or opt out of having their actions logged by mobile data access system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of mobile data access system 100 and other elements of a social-networking system through blocking, data hashing, anonymization, or other suitable techniques as appropriate.

Figure 2:
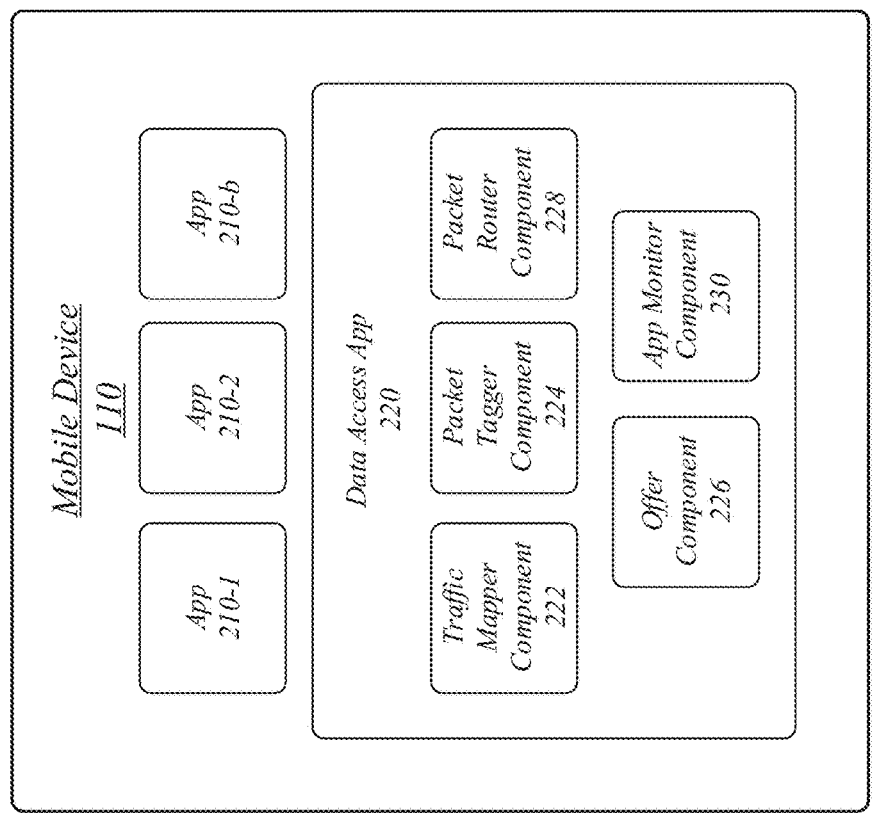
FIG. 2 illustrates an embodiment of a client device according to the mobile data access system.

FIG. 2 illustrates an embodiment of a mobile device 110 for the mobile data access system 100. The mobile device 110 may include any apparatus, generally portable, capable of executing software applications, receiving and responding to control directives from a user, and communicating data over a wireless connection to a network. The mobile device 110 may include, for example, and without limitation, a smart phone, a tablet computer, an e-book reader, or a personal wearable device such as a smart watch.

The mobile device 110 may have installed upon it one or more software applications, or "apps" such as app 210-1, app 210-2, and app 210-*b*. An app 210 may include stand-alone applications, client applications that communicate with a server to provide a service, thin clients that provide an interface to a server-provided function, and so forth. Some of apps 210 may require occasional, constant, or near-constant access to one or more data end points 170.

The mobile device 110 may also have a data access app 220 installed thereon. The data access app 220 may be installed on the mobile device 110 prior to purchase by a user, or may be downloaded and installed after the mobile device 110 is purchased by the user. The data access app 220 may operate on the mobile device 110 to enable some of the operations and functionality of the mobile data access system 100.

In some embodiments, the data access app 220 may register a virtual private network (VPN) profile with an operating system executing on the mobile device 110. An actual VPN need not be established. By registering a VPN profile, the data access app 220 may receive all network data packets from any app 210 sending a network data packet, prior to the network data packet being transmitted on a network. This may allow the data access app 220 to capture data about how the apps 210 used on the mobile device 110 use network data.

The data access app 220 may include one or more functional components that provide the operations described herein. For example, the data access app 220 may include a traffic mapper component 222 to identify, for a network access event, an app originating the network access event. A network access event may include any attempt by the mobile device 110 to send data over a wireless network. For example, whenever the data access app 220 receives a network data packet from another app 210, the data network packet may be part of a network access event.

Identifying the app originating the network access event may include identifying the app 210 that created a network data packet. In some cases, the app 210 with which the user is interacting is not the app that created the network data packet. For example, the user may be using a social networking app (App1) and viewing a video within the social networking app. The video may be presented by another app (App2) through the social networking app. The traffic mapper component 222 may identify the app that the user is interacting with (App 1) as the originating app in some embodiments, even if App2 actually generated the network access event. When the user needs to decide on a network data access plan, the user may not realize that such network access events are generated by an app other than the one they are using. It may be more intuitive for the user to purchase a data plan that allows access by App1. The traffic mapper component 222 may also, or alternatively, identify a data end point 170 of the network access event.

The traffic mapper component 222 may measure an amount of network traffic requested or used by an app. The traffic mapper component 222 may, for example, record the size of network data packets sent and received by an app 210. In addition, the traffic mapper component 222 may record data about which apps originate network access events, and/or amounts of network traffic to a specific data end point, process, or socket. The traffic mapper component 222 may send the data it records to a data package service 120 periodically, e.g. every minute, every hour, every day and so forth.

The data access app 220 may include a packet tagger component 224. The packet tagger component 224 may attach an identifier to a network data packet. The identifier may indicate an originating app of the data packet, as determined by the traffic mapper component 222. The identifier may be appended or otherwise added to a network data packet, for example, as a tag or a label. The identifier may include a set of one or more bits that uniquely identify the originating app to a data access server 160.

The data access app 220 may include an offer component 226. The offer component 226 may receive one or more data service packages from a data package service 120 in response to a network access event. The offer component 226 may present offers for the one or more data service packages in a user interface on the mobile device 110. The offer component 226 may receive a control directive selecting one of the offers and may inform the data package service 120 of the selected offer. The user interface may be presented while the originating app is executing on the foreground on the mobile device 110, and/or when the originating app is opened on the apparatus. The user interface may present an option that blocks the network access event if there are no offers available.

The data access app 220 may include a packet router component 228. The packet router component 228 may decide where to send a network data packet received from an app 210 at the data access app 220. When the mobile device 110 is connected to a Wi-Fi network, the packet router component 228 may send a data packet to a data end point 170 via the Wi-Fi network. When the mobile device 110 is not connected to a Wi-Fi network, the packet router component 228 may send the network data packet to the data access server 160 using a cellular data network.

The data access app 220 may include an app monitor component 230. The app monitor component 230 may collect data about app usage on the mobile device 110. For example, and without limitation, the app monitor component 230 may collect data on what apps are used on the mobile device 110, a duration of use of apps, a time of day of use of apps, a sequence of apps used, or a frequency of use of an app. The app monitor component 230 may send the collected data to a data package service 120 at some specified period, or when a specified amount of data is collected.

The operations and functions of the data access app 220 may be provided by more, fewer, or other components. In some embodiments, two or more of the described components may be combined into a single component. The embodiments are not limited to these examples.

Figure 3:
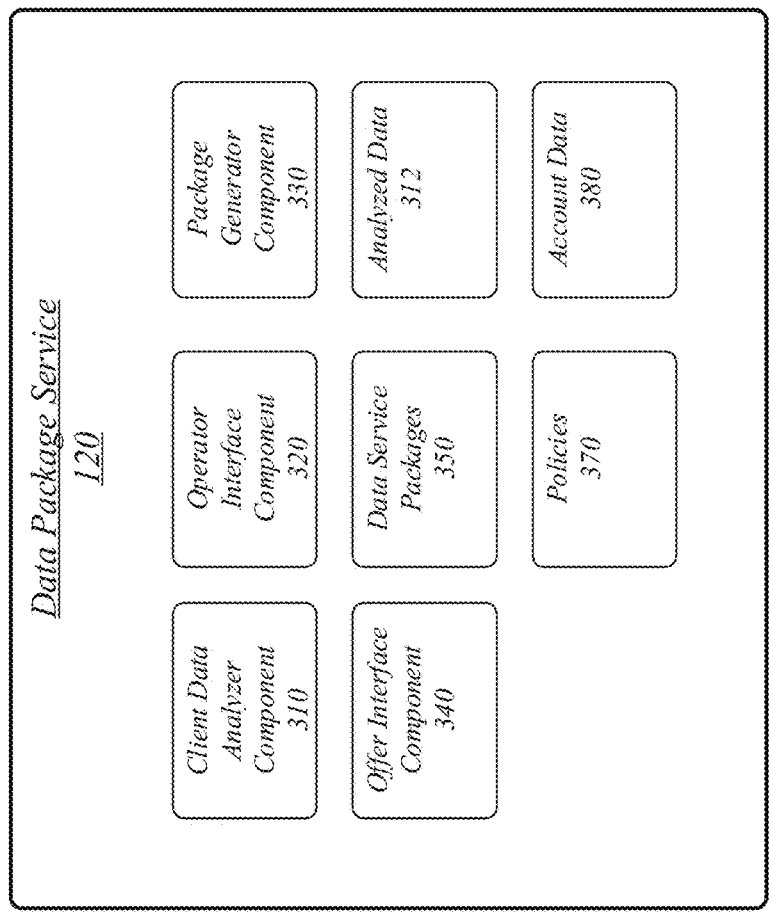
FIG. 3 illustrates an embodiment of a data package service according to the mobile data access system.

FIG. 3 illustrates an embodiment of a data package service 120. The data package service 120 may include one or more computing devices, centralized or distributed, to provide the generation and sale of data service packages to mobile device users.

The data package service 120 may include one or more functional components. For example, the data package service 120 may include a client data analyzer component 310. The client data analyzer component 310 may receive application usage data and analyze the application usage data to obtain analyzed data 312. The application usage data received from mobile devices 110 may include data about app use on one or more client devices, e.g. mobile devices 110, for example, about which apps are used, which apps are used together or in sequence, how long an app is used, at what time of day an app is used, what apps are used by other apps, and so forth. The application usage data may include, for example, an application identifier parameter, a network usage parameter, a data end point parameter, an application sequence parameter, a frequency parameter, or a duration parameter. An application identifier parameter may identify an application used on a mobile device. A network usage parameter may indicate an amount of network data consumption of an application in use on a mobile device. A data end point parameter may identify data end points accessed by an application. An application sequence parameter may identify a sequence of applications used on a mobile device. A frequency parameter may indicate a frequency of use of an application on a mobile device. A duration parameter may indicate a duration of use of an application on a mobile device. The data received may also include network usage data for a mobile device, such as how much network data is sent and received, which apps send and receive network data, how much network data is used by an app, at what times of day network data is sent and received, what types of data are sent in network data and so forth. The data may be received from a data access app 220 operating on the respective mobile devices.

The client data analyzer component 310 may aggregate the data received from multiple mobile devices. The client data analyzer component 310 may perform various statistical operations on the aggregated data. For example, and without limitation, the client data analyzer component 310 may determine average values, mean values, highest values, lowest values, frequencies, periods, probabilities, and other values. The client data analyzer component 310 may analyze the data received from the mobile devices to determine, in the aggregate, what apps are used by the largest number of mobile devices; which apps are used with other apps; sequences of apps used; the data consumption of apps; whether an app is used continuously or sporadically; length of an app use; time of day used; days of the week used; whether an app operates in the background or foreground; amounts and/or types of data transferred; rates of data transfer; and so forth. The client data analyzer component 310 may also generate user segments, by identifying groups of users who have some aspect of app use in common.

The data package service 120 may include an operator interface component 320. The operator interface component 320 may communicate with the operator of the cellular system 130. For example, the operator interface component 320 may receive operator data. Operator data may include, for example, and without limitation, information about available bandwidth at times of day, target revenues, operator basic data rates, lowest viable data rates, and targeted data rates. The operator interface component 320 may act as the integration point with the operator network using a one-time set-up process that does not require any modifications to the operator network and allows the data package service 120 to sell data service packages 350 to users that allow the users to access the data services of the operator network.

The data package service 120 may include a package generator component 330. The package generator component 330 may receive the analyzed data 312 and design one or more data service packages 350 according to the analyzed data. The package generator component 330 may also receive data received from the operator and may design one or more data service packages 350 according to the operator data.

The package generator component 330 may create data service packages 350 on a substantially continuous basis, e.g. every minute, every 30 seconds, every two minutes, or at any other regular or irregular frequency. The package generator component 330 may also analyze historical data about purchased and unpurchased data service packages 350 in determining what parameters to include in a data service package 350.

The package generator component 330 may create data service packages 350 for many different purposes and scenarios. Data service packages 350 may be generated, for example, for a specific app. For a given specific app, various data service packages 350 may be created according to how much data the app typically transfers, a length of time that the app is typically in use, a time of day or day of the week that the app is typically used, and so forth. Each data service package 350 may have a different price. Data service packages 350 may be created for groups of apps that are often used together, for groups of apps that users of a user segment typically use, or for an app that provides services across multiple networks, IP addresses and/or providers.

Some data service packages 350 may be generated according to the operator data. For example, discounted data service packages may be created that allow access during a time of day where the operator typically has lower network traffic. The price of data service packages may be set in an attempt to maximize revenue for the operator, to maximize a number of purchases, to maximize user retention, and/or to maximize user lifetime value.

Some data service packages 350 may be specific to a location of the mobile device at the time of sale or use. Some data service packages 350 may be designed to allow AB testing of the data service package 350, where two price points of the same offer are provided, and sales and use data may be analyzed after a test period.

In addition to generating data service packages 350 based on aggregated data from multiple users, some data service packages 350 may be generated for a particular user, according to the data specific to that user.

The package generator component 330 may analyze existing data service packages 350 according to purchase and use data, and may modify the existing data service packages. For example, the package generator component 330 may determine the data service packages 350 with most use and most revenue, and the least use and least revenue. Those with the least use or revenue, for example, may have their price changed, or may be eliminated altogether. The package generator component 330 may compare the data service packages 350 having the least revenue to those having the most revenue. The package generator component 330 may compare the data service packages 350 having the least revenue to the data service packages 350 having similar price or similar duration but with higher revenue. These and other comparisons or analyses may prompt changes to data service packages 350 to enhance number of purchases and/or revenue, for example.

The data package service 120 may include an offer interface component 340. The offer interface component 340 may receive a request for a data service package 350 for a mobile device. The request may be transmitted from the data access server 160, for example, when a mobile device attempts to send data on the cellular data network without an active data service package 350 for the type of access. In some embodiments, the request may also include the current context of the mobile device 110. The context may include, for example, what app was in the foreground when the network access event occurred, or what app originated the network access event.

In some embodiments, the offer interface component 340 may access the analyzed data 312 for the particular mobile device and may select one or more data service packages 350 according to the analyzed data 312 and the context, when provided. For example, the analyzed data 312 may indicate that an app, "App A", is used the most on the mobile device 110, or uses the most data, or is generally used for 15 minutes every evening around 6 p.m., or is usually used before another app. The offer interface component 340 may accordingly, select one or more data service packages 350 that would permit the type of access being attempted. In some embodiments, the offer interface component 340 may also consider historical data service packages selected by the user, including what data service packages 350 were previously purchased, how much money the user has in a payment account, or a maximum payment that the user has made for a data service package 350.

In some embodiments, the offer interface component 340 may determine whether any potentially relevant data service packages are associated with a discount, a marketing campaign, or are sponsored for promotion, for example, by a particular app developer. Such data service packages may be included in the selection for the user.

The offer interface component 340 may transmit the selected one or more data service packages 350 to the mobile device, for example via the data access server 160. The offer interface component 340 may receive a selection of one of the one or more data service packages 350 from the mobile device, again via the data access server 160.

The offer interface component 340 may coordinate payment for a selected data service package 350. Users who have a data access app 220 installed on their mobile device 110 may register with the data package service 120 and create an account, which may be stored in account data 380. Part of the registration process may include providing one or more forms of electronic payment, such as credit card numbers, payment service account numbers, an account number at the cellular service operator, or bank account numbers. When a user selects a data service package 350 for purchase, the offer interface component 340 may perform the transaction of receiving payment from the user according to the user's account information and transferring some or all of the payment to the cellular service operator.

The offer interface component 340 may also generate a policy 370 associated with the client selection. A policy 370 may include the parameters of the purchased data service package 350 in a form that can be used by the data access server 160 to determine whether a network access event is permitted by a mobile device. A policy 370 may include, for example, an identifier of an app that is allowed data access, an amount of data that may be transferred, a duration of time during which data may be transferred, a time of day at which data may be transferred, and so forth. A policy 370 may be in the form of a data structure having fields that include the parameters. A policy 370 may be a list, a rule, a database entry or any other form that the data access server 160 can understand.

Figure 4:
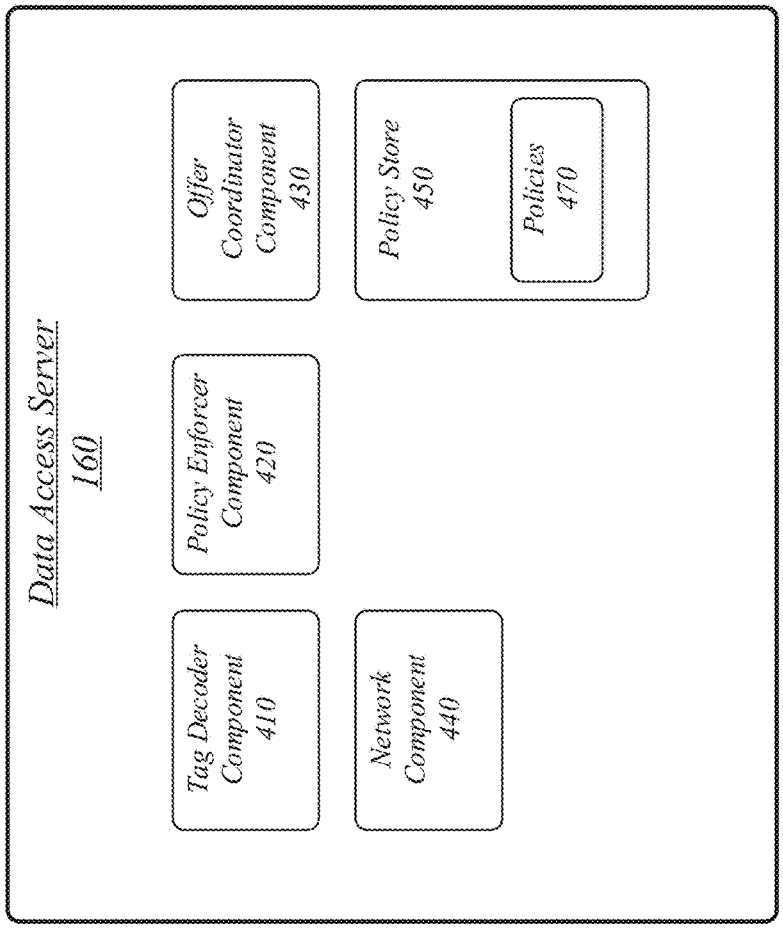
FIG. 4 illustrates an embodiment of a data access server according to the mobile data access system.

FIG. 4 illustrates an embodiment of a data access sever 160. The data access server 160 may include one or more computing devices, centralized or distributed, that enable a mobile device 110 to send and receive network data via a cellular system 130 according to one or more data service packages purchased by a user of the mobile device 110. The data access server 160 may include one or more functional components to perform these operations.

The data access server 160 may include a tag decoder component 410. The tag decoder component 410 may receive a network data packet from a client device, e.g. a mobile device 110, and may determine an originating app and a data end point from the network data packet. For example, the tag decoder component 410 may be able to read, parse, decode or otherwise understand an identifier, e.g. a tag, added to the network data packet by the data access app 220 on the mobile device 110. The tag decoder component 410 may determine the data end point from an address in the network data packet.

The data access server 160 may include a policy enforcer component 420. The policy enforcer component 420 may determine whether there is a policy 470 in a policy store 450 that allows the client device to access a cellular data network. For example, the policy enforcer component 420 may search the policy store 450 for one or more policies 470 associated with the mobile device 110 that sent the network data packet, and then search any such policies 470 for a policy that: allows data access by the originating app; allows access at the current time of day; allows access to the data end point; has a sufficient amount of unused time to permit the data access for the network data packet; and/or has a sufficient amount of unused data access to permit the data access for the network data packet.

The data access server 160 may include an offer coordinator component 430. The policy enforcer component 420 may prompt the offer coordinator component 430 to request a data service package from the data package service 120 when there is no policy 470 that allows access by the mobile device 110. The offer coordinator component 430 may receive one or more data service packages in the form of offers from the data package service 120 and may forward the one or more offers to the mobile device 110.

The offer coordinator component 430 may then receive a selection of an offer from the mobile device 110 and may forward the selection to the data package service 120. Once the data package service 120 has completed a payment transaction, the offer coordinator component 430 may receive a policy 470 associated with the selection from the data package service 120. The policy 470 may define parameters for when the mobile device 110 can access a cellular data network. The offer coordinator component 430 may store a received policy 470 in the policy store 450.

In some embodiments, the policy enforcer component 420 may discard the network data packet when there is no policy that allows access by the mobile device 110. The policy enforcer component 420 may, in some embodiments, discard a policy 470 once its parameters are no longer valid, e.g. when a data amount limit of the policy is reached, and/or when a time period of the policy has expired.

The data access server 160 may include a network component 440. The network component 440 may forward the network data packet to the data end point via the cellular data network when a policy 470 is found or received that does allow the access. In various embodiments, the communication between the network component 440 and the cellular data network is rate-adjusted, e.g. zero-rated. For example, the network component 440 may send and receive data via the cellular data network without additional monetary charges.

The data package service 120 and the data access server 160 may be physically and/or logically separate from each other. In some embodiments, the data package service 120 and the data access server 160 may be logically combined, e.g. available at the same network address or may be physically on the same device. In some embodiments, either the data package service 120 or the data access server 160 may be a component of the cellular data network and may be controlled and operated by the operator of the cellular system 130. Alternatively, either the data package service 120 or the data access server 160 may be controlled and operated by a third-party to the cellular system operator, and may interact with the cellular system 130 by mutual agreement.

Figure 5:
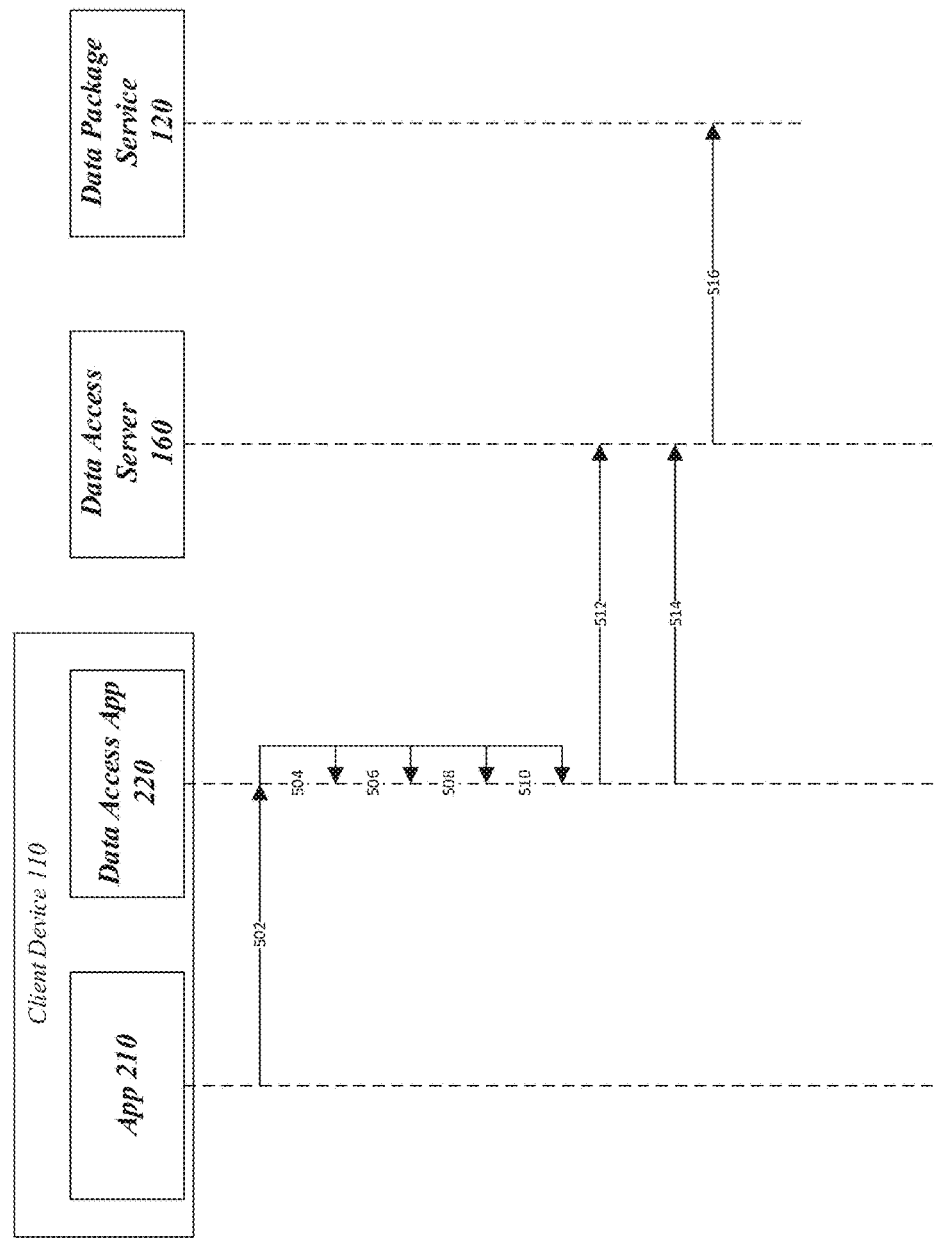
FIG. 5 illustrates an embodiment of a message flow for the mobile data access system.

FIG. 5 illustrates an embodiment of a message flow 500 for the system 100. The message flow 500 may represent messages communicated among the components of system 100. As used in FIG. 5, a "message" may include data and/or instructions communicated from one component to another, as well as internal functions within a component. In particular, the message flow 500 may occur among the app 210 and data access app 220 of a mobile device 110, the data access server 160, and the data package service 120.

In message flow 500, time flows from the top of the diagram toward the bottom. Message flow 500 may represent messages communicated among the illustrated components when an app 210 generates a network access event, e.g. tries to access a data network. In the illustrated example, the mobile device 110 does not have a connection to a Wi-Fi network.

The message flow 500 begins when the app 210 generates a network access event in message 502. A network access event may include, for example, one or more network data packets to be sent to a data end point 170. The network access event may be, for example and without limitation, a request to load a web page, a request to download or stream a video, or to send or receive electronic mail. The data access app 220 automatically receives the network access event as message 502.

The message flow 500 continues when the data access app 220 determines the originating app for the message 502, in message 504. For example, the data access app 220 may determine which app is in the foreground. The data access app 220 may also use information such as a target IP address for the network access event, a process identifier of the network access event, an app identifier, a packet definition, or other methods of determining which app 210 caused the network access event.

The message flow 500 continues when the data access app 220 collects data about the originating app in message 506. For example, the data access app 220 may record that the identified originating app generated a network access event at a specific date and time. The collected information may be added to a data repository that also contains information collected about other apps that generated network access events.

The message flow 500 continues when the data access app 220 collects data about the network access event, in message 508. For example, the data access app 220 may record the size of the packet(s) that make up the network access event, an destination data end point 170, time of day, and so forth. In some embodiments, the collected data in message 508 may be stored separately from the collected data in message 506. Alternatively, the data may be stored together.

The message flow 500 continues when the data access app 220 attaches an identifier to the network data packet(s) of the network access event in message 510. For example, the data access app 220 may append a short (relative to the size of the network data packet) tag, label or "color" to the front or the back of a network data packet that uniquely identifies the originating app to the data access server 160.

The message flow 500 continues when the data access app 220 sends the tagged data packet(s) of the network access event, and a context, to the data access server 160 in message 512. The context may include, for example, what app was in the foreground when the network access event occurred, what app was previously in the foreground, a location of the mobile device 110, an identifier of the mobile device, a user identifier, and/or other information that may be of use in selecting a data service package for the app 210.

The message flow 500 continues when the data access app 220 sends the collected data about the app and about network usage to the data access server 160 in message 514. The message 514 can be sent at any time, and may be sent more than once when more data is collected by the data access app 220.

The message flow 500 continues when the data access server 160 sends the collected data to the data package service 120 in message 516. The message 516 may also be sent more than once when more data is received from the data access app 220.

Figure 6:
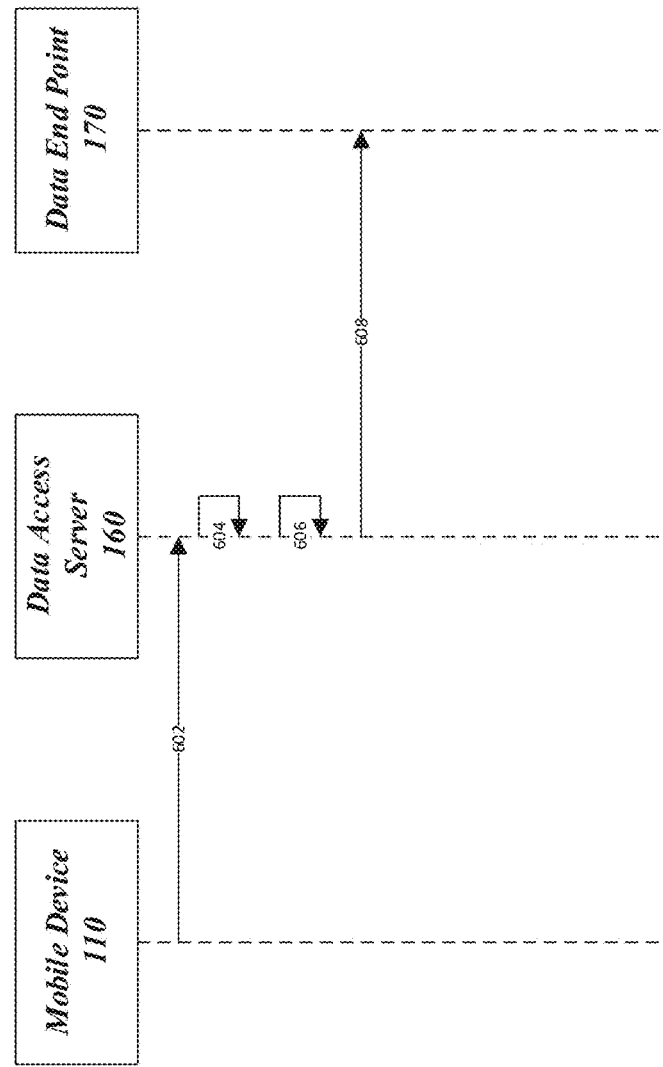
FIG. 6 illustrates an embodiment of a second message flow for the mobile data access system.

FIG. 6 illustrates an embodiment of a message flow 600 for the system 100. The message flow 600 may represent messages communicated among the components of system 100. As used in FIG. 6, a "message" may include data and/or instructions communicated from one component to another, as well as internal functions within a component. In particular, the message flow 600 may occur among the mobile device 110, the data access server 160, and a data end point 170, and may continue the message flow 500.

In message flow 600, time flows from the top of the diagram toward the bottom. Message flow 600 may represent messages communicated among the illustrated components when an app on the mobile device 110 attempts to access a data network and the user of the mobile device 110 has already purchased a data service package for that use.

The message flow 600 begins when the mobile device 110 sends the network data packet(s) and context to the data access sever 160 in message 602. The message 602 may be the same as the message 512 from the message flow 500.

The message flow 600 continues when the data access sever 160 reads the tag(s) on the network data packet(s), in message 604. The data access sever 160 may use the tag(s) to identify which app on the mobile device 110 was the app that originated the network data packet(s). In some embodiments, the data access server 160 may then remove the tag(s) from the network data packets. Generally, the data access server 160 may also read a data end point of the network data packets, but does not read the load of the network data packets.

The message flow 600 continues when the data access server 160 searches its policy store for a policy that allows access to the cellular data network for the app and the mobile device, in message 606. The data access server 160 may search for policies specific to the mobile device 110, and then within the policies found, may search for a policy having parameters that allows access to the cellular data network for the mobile device 110 generally, or by the app 210 specifically. In the illustrated example, assume that the data access server 160 finds a policy that allows the mobile device 110 to use the cellular data network.

The message flow 600 continues when the data access server 160 sends the network data packet(s) received in message 602 to the data end point 170, in message 608. The message 608 may be sent using the cellular system 130 without any further charges to the user.

Figure 7:
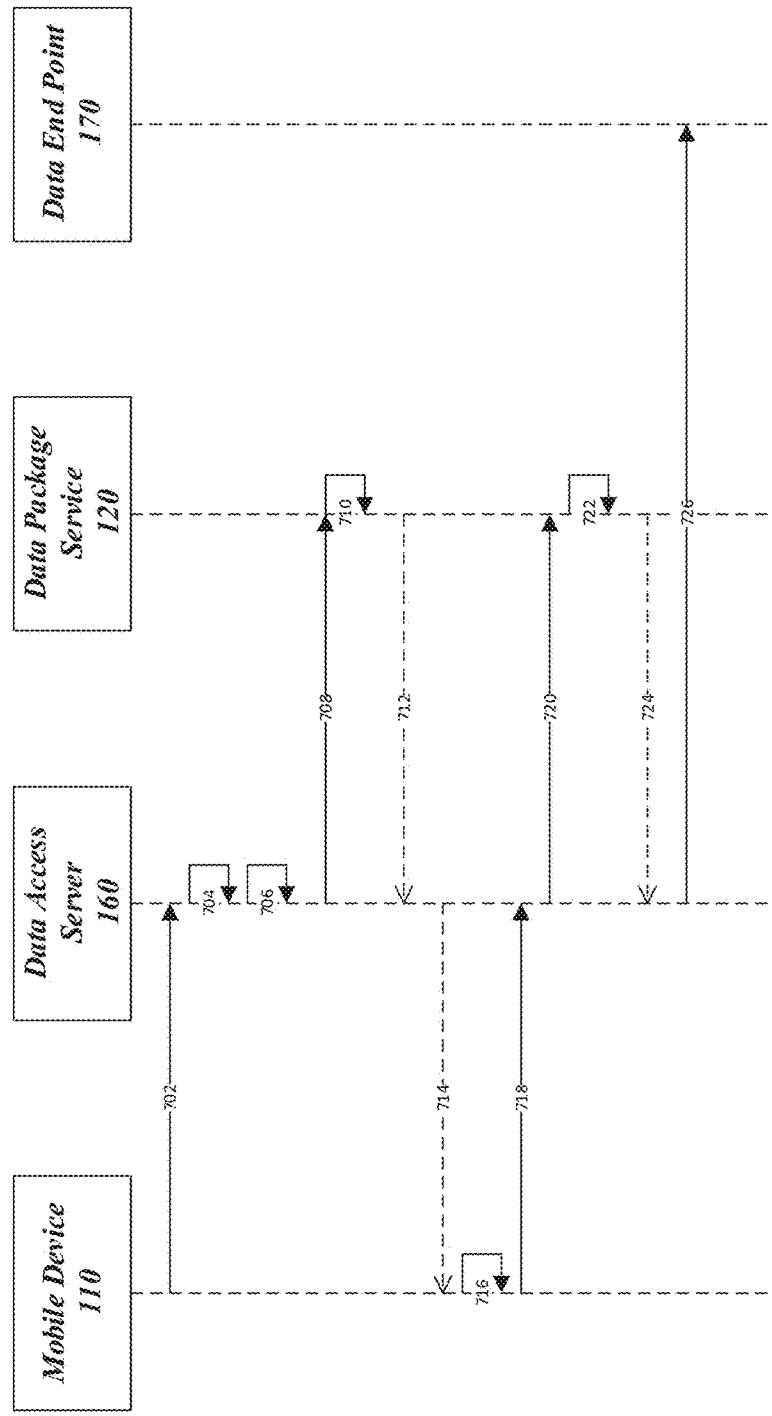
FIG. 7 illustrates an embodiment of a third message flow for the mobile data access system.

FIG. 7 illustrates an embodiment of a message flow 700 for the system 100. The message flow 700 may represent messages communicated among the components of system 100. As used in FIG. 7, a "message" may include data and/or instructions communicated from one component to another, as well as internal functions within a component. In particular, the message flow 700 may occur among the mobile device 110, the data access server 160, the data package service 120, and a data end point 170.

In message flow 700, time flows from the top of the diagram toward the bottom. Message flow 700 may represent messages communicated among the illustrated components when an app on the mobile device 110 attempts to access a data network and the user of the mobile device 110 has not purchased a data service package for that access.

The message flow 700 begins similarly to the message flow 600; that is, the messages 702, 704, and 706 are the same as messages 602, 604, and 606, respectively.

The message flow 700 differs from the message flow 600 when, in the message 706, the data access server 160 determines that there is no policy that allows the mobile device 110 to access the cellular data network for the network data packet(s) in the message 702.

The message flow 700 continues when the data access server 160 requests data service packages from the data package service 120 in message 708. The message 708 may include the context received in the message 702.

The message flow 700 continues when the data package service 120 selects one or more data service packages in message 710. The data package service 120 may consider the context of the mobile device 110 when selecting data service packages, and may, for example, select data service packages that allow the originating app or the app currently in the foreground (if different from the originating app) to access a data network. The data package service 120 may select data service packages that allow access at the time of day of the message 710, or that allow an expected amount of data traffic. If the cellular service network is congested, the data package service 120 may select one or more data service packages that offer discounts to shift the network traffic to a less congested time of day. The embodiments are not limited to these examples.

The message flow 700 continues when the data package service 120 returns the selected data service packages to the data access server 160 in message 712. In an embodiment, the message 712 may include descriptive information for each selected data service package such as the parameters of access and cost, and may include an identifier for each different data service package.

The message flow 700 continues when the data access server 160 forwards the selected data service packages of message 712 to the mobile device 110 in message 714.

The message flow 700 continues when the mobile device 110 presents the selected data service packages as offers in message 716. The offers correspond to the selected data service packages. The data access app 220 on the mobile device 110 may use the descriptive information to present a UI on a display of the mobile device 110. The mobile device 110 may receive a control directive from the user that selects one of the offers (not shown).

The message flow 700 continues when the mobile device 110 sends the selected offer to the data access server 160 in message 718. The message 718 may include the identifier of the data service package that corresponds to the selected offer.

The message flow 700 continues when the data access server 160 forwards the selection to the data package service 120 in message 720.

The message flow 700 continues when the data package service 120 obtains payment for the selected data service package, and generates a policy corresponding to the selected data service package, in message 722. The data package service 120 may transfer funds from a user account to the cellular service operator. Once the payment is completed, the data package service 120 may generate a policy that corresponds to the paid-for data service package. The policy may define the parameters under which the mobile device 110 is allowed to access the cellular data network.

The message flow 700 continues when the data package service 120 sends the policy to the data access server 160 in message 724. The data access server 160 may store the policy.

The message flow 700 continues when the data access server 160 sends the network data packet(s) received in the message 702 to the data end point 170, in message 726. The message 726 may be sent using the cellular system 130 without any further charges to the user.

Figure 8:
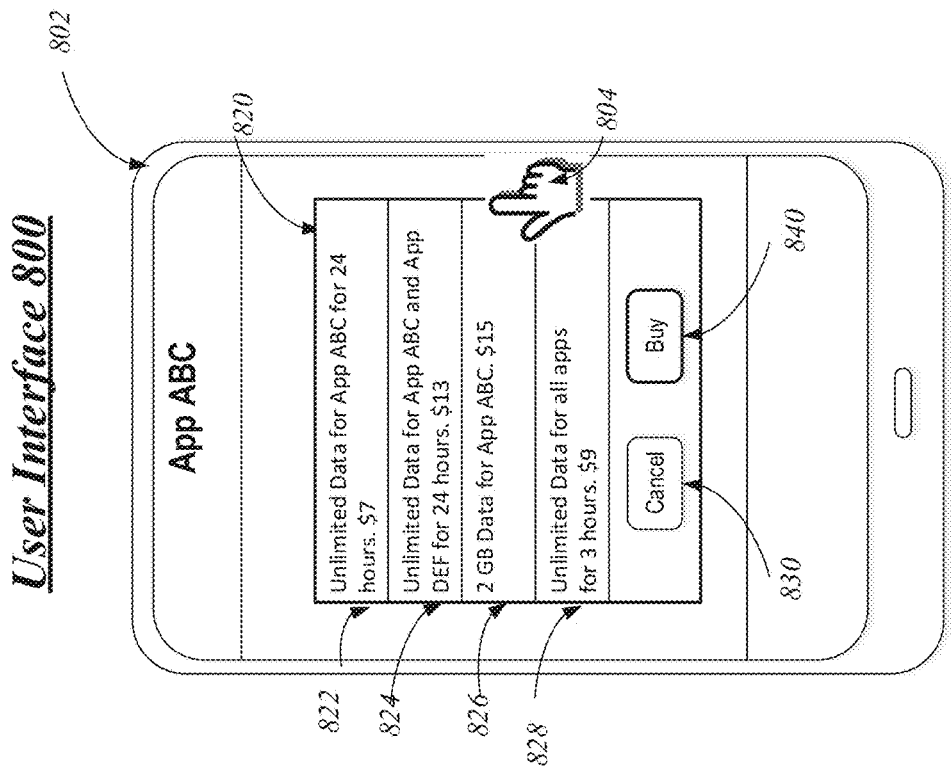
FIG. 8 illustrates an embodiment of a user interface for the mobile data access system.

FIG. 8 illustrates an embodiment of a user interface (UI) 800. The UI 800 may be presented on a mobile device 802. In particular, the UI 800 may be presented on the mobile device 802 when one or more apps are attempting to communicate network data without a cellular data contract or data service package. As shown in FIG. 8, the app "App ABC" is operating in the foreground, i.e. the user is interacting with App ABC. Other apps may be executing on the mobile device 802, but are in the background and not capable of receiving user input at the illustrated moment. As illustrated, App ABC may have just been opened by the user, or may have just been brought from the background to the foreground. In the illustrated example, the mobile device 802 is not connected to a Wi-Fi network.

In some embodiments, the UI 800 may be presented when the App ABC attempts to send a network data packet. The UI 800 may be presented when the App ABC is first opened and/or when the App ABC is brought to the foreground.

The UI 800 may include a dialog 820 that shows one or more offers for data service packages. As shown, the dialog 820 includes an offer 822, an offer 824, an offer 826, and an offer 828. More or fewer offers may be presented. By way of example, the offer 822 is for a data service package that allows unlimited data access for one app (App ABC) for a limited time period (24 hours), and costs $7.

The offer 824 is for a data service package that allows unlimited data access for two apps (App ABC and App DEF) for a limited time period, and costs $13. This type of data service package may be useful, for example, for apps that are frequently used together, or for the most used apps on the mobile device 802.

The offer 826 is for a data service package that allows a limited amount of data traffic for one app for an unlimited amount of time, and costs $15. The offer 828 is for a data service package that allows unlimited data access for all apps for a limited amount of time, and costs $9.

Other offers may be provided for data service packages that, for example, have lower cost for data access if the access occurs at times when there is less traffic on the cellular service network. The examples are not limited to these examples.

The user of the mobile device 802 may review and select an offer that aligns with the user's needs and budget. In the illustrated example, the user indicates with a control directive 804 that they would like to select the offer 826. The user may then select the buy button 840 to initiate the transaction, or the cancel button 830 to prevent a purchase.

Once the buy button 840 is selected, the selected offer is communicated to the data package service 120, which coordinates payment for the data service package, and provides an associated policy to the data access server 160. The data access server 160 may then permit, in the illustrated example, use of the data services of the cellular system 130 for App ABC until two GB of data have been transferred.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
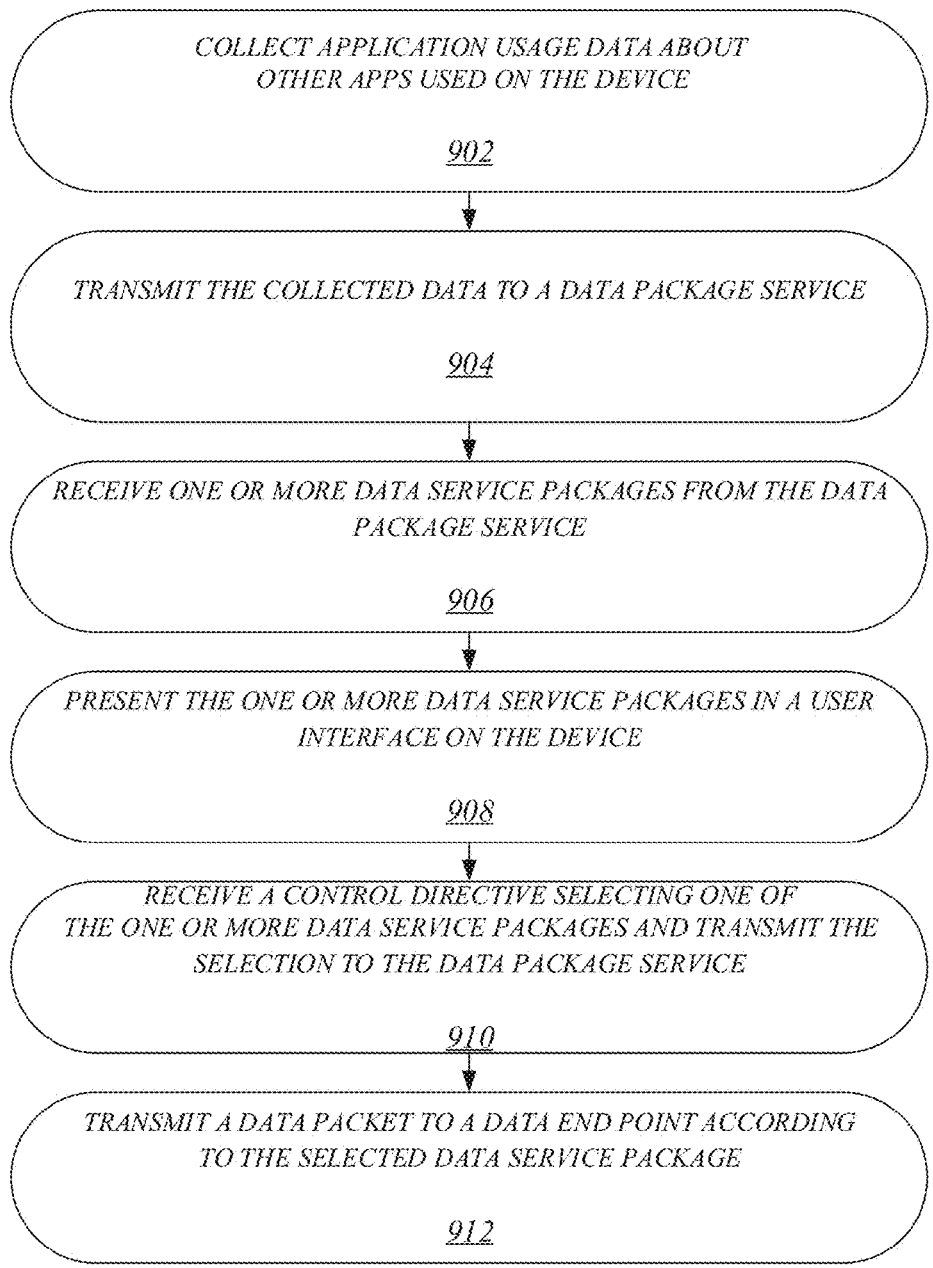
FIG. 9 illustrates an embodiment of a logic flow for the mobile data access system.

FIG. 9 illustrates one embodiment of a logic flow 900. The logic flow 900 may be representative of some or all of the operations executed by one or more embodiments described herein. In particular, the logic flow 900 may illustrate operations performed on a mobile device 110 related to the creation and purchase of data service packages.

In the illustrated embodiment shown in FIG. 9, the logic flow 900 may collect application usage data about other apps used on the mobile device, in block 902. For example, the data access app 220 may intercept all traffic intended for a network and may record what app originated the traffic, what apps were used previously and when, how much data traffic is generated, times of day and days of the week when data traffic is requested, and any other information related to app and network usage on the mobile device 110. In some embodiments, only data about apps that use a network is collected. In other embodiments, data about apps that do not use a network may also be collected.

The logic flow 900 may transmit the collected data to a data package service, in block 904. For example, the data access app 220 may transmit the collected data to the data package service 120 via the data access server 160 at regular intervals, at irregular intervals, when requested by the data access server 160 or the data package service 120, when new data is collected, or at any other time or frequency.

The logic flow 900 may receive one or more data service packages from the data package service, in block 906. For example, the data access app 220 may receive descriptive information about data service packages from the data access server 160 after attempting to access the cellular data network without a paid-for data service package.

The logic flow 900 may present the one or more data service packages from the data packager service in a user interface on the mobile device, in block 908. For example, the data access app 220 may present a user interface (UI) showing offers that describe the various data service packages and their costs. The UI may be presented within or on top of a UI of the foreground app.

The logic flow 900 may receive a control directive selecting one of the data service packages and may transmit the selection to the data package service, in block 910. For example, the data access app 220 may detect a user selection such as a touch or a click on one of the offers in the presented UI. The identifier of the selected offer may be transmitted back to the data package service 120 via the data access server 160.

The logic flow 900 may transmit a network data packet to a data end point according to the selected data service package, in block 912. For example, assuming that payment for the selected data service package is successful, the data access app 220 may transmit one or more network access events related to the data service package to the data end points 170, via the data access server 160, without additional cost to the user.

Figure 10:
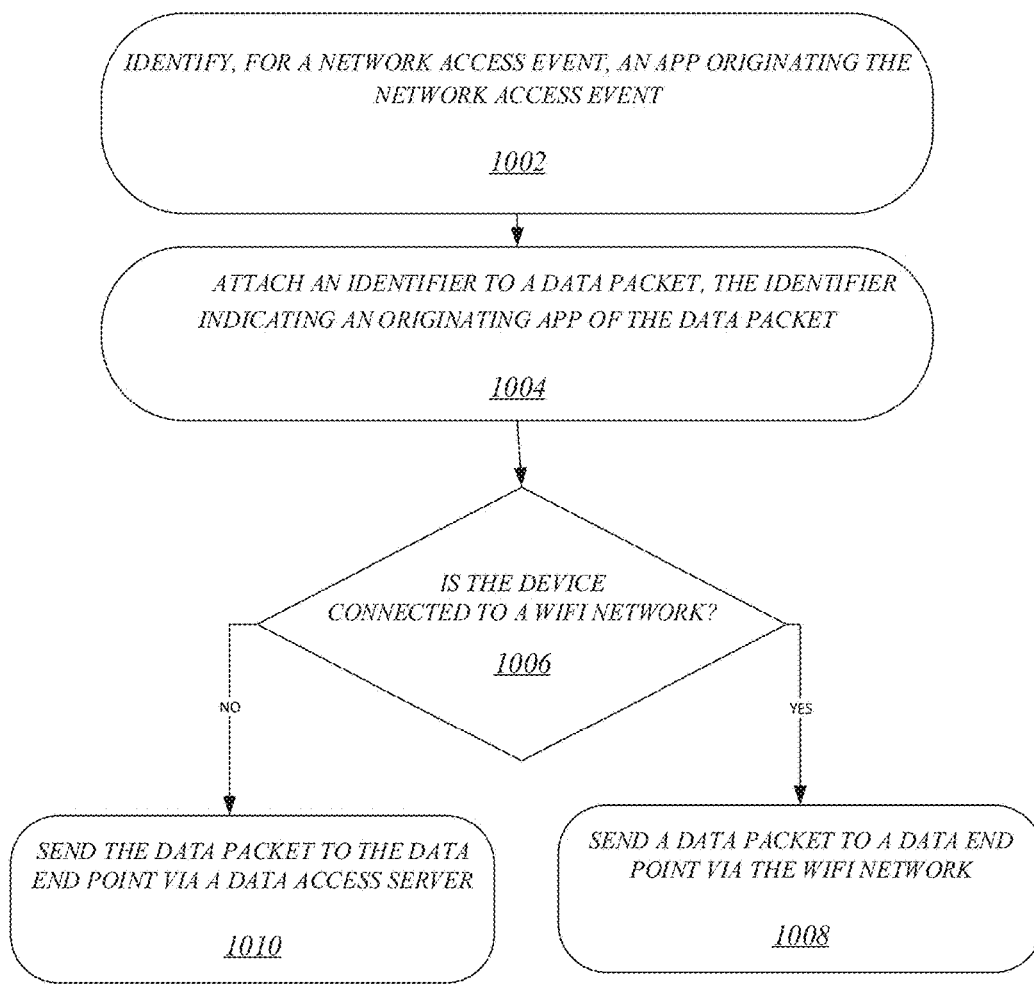
FIG. 10 illustrates an embodiment of a second logic flow for the mobile data access system.

FIG. 10 illustrates one embodiment of a logic flow 1000. The logic flow 1000 may be representative of some or all of the operations executed by one or more embodiments described herein. In particular, the logic flow 1000 may illustrate other operations performed by the mobile device 110 when a network access event occurs.

In the illustrated embodiment shown in FIG. 10, the logic flow 1000 may identify an app originating a network access event, in block 1002. For example, the data access app 220 may intercept one or more network data packets comprising the network access event, and may determine what app 210 created the network data packets, what app 210 is trying to access the network, or what app 210 is operating in the foreground at the time of the network access event. In some cases, the app that is in the foreground, and that the user is interacting with, is the app that originated the network access event. For example, if the user is interacting with an email app and the network access event is related to sending an email message, then the originating app may be the email app.

In other cases, the user may be interacting with a foreground app that is not directly responsible for originating the network access event. For example, if the user is interacting with a social networking app and selects a video to view within the social networking app, the video may be hosted from a different data end point than the social networking app, and may be accessed by a video app that can play through the social networking app. In such a case, the user believes they are interacting with the social networking app, even though it is the video app that creates the network access event. The data access app 220 may identify the social networking app as the originating app, rather than the video app, because that is what the user understands to be happening. In some embodiments, the data access app 220 may identify all of the apps involved in the network access event as the originating apps.

The logic flow 1000 may attach an identifier indicating the identified originating app to a network data packet in the network access event, in block 1004. For example, the data access app 220 may append a short bit sequence to one or more network data packets in the network access event that identify the originating app to the data access server 160, for example, as a header.

The logic flow 1000 may determine whether the mobile device 110 is connected to a Wi-Fi network, in block 1006. For example, the data access app 220 may determine or inquire to the operating system or a network controller as to whether a Wi-Fi connection exists.

When the mobile device is connected to a Wi-Fi network, the logic flow 1000 may send the network data packet to a data end point via the Wi-Fi network, in block 1008. In some embodiments, blocks 1006 and 1008 may occur before blocks 1002 and 1004.

When the mobile device is not connected to a Wi-Fi network, the logic flow 1000 may send the network data packet to a data end point via a data access server, in block 1010. For example, the data access app 220 may send the tagged data packet(s) to the data access server 160 for forwarding, when a policy exists, to the data end point 170 of the network access event.

Figure 11:
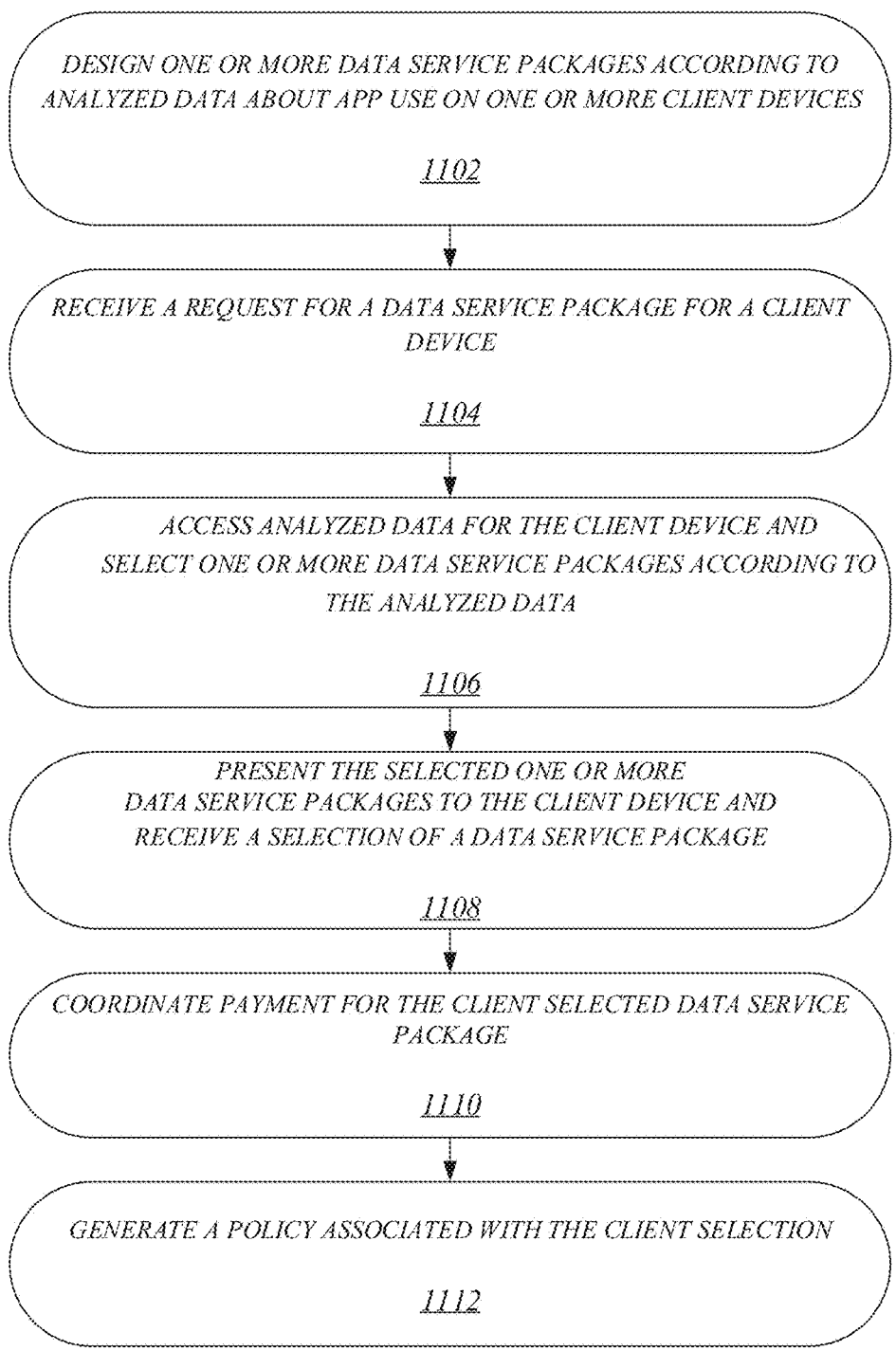
FIG. 11 illustrates an embodiment of a third logic flow for the mobile data access system.

FIG. 11 illustrates one embodiment of a logic flow 1100. The logic flow 1100 may be representative of some or all of the operations executed by one or more embodiments described herein. In particular, the logic flow 1100 may illustrate operations performed by a data package service.

The logic flow 1100 may design one or more data service packages according to analyzed data about app use on one or more client devices, in block 1102. For example, the data package service 120 may design data service packages 350 for the most used apps, for the apps that use the most data, for groups of apps commonly used together, for times of day of high data use, for times of day of low network congestions, and so forth, as determined from the analyzed data. Other data service packages may be designed to maximize operator revenue, increase repeat purchases by users, incentivize app use, and so forth. A data service package may include one or more parameters that define how a mobile device can access and use a cellular data network, and may have an associated price.

The logic flow 1100 may receive a request for a data service package for a client device in block 1104. For example, the data package service 120 may receive this request when a mobile device 110 is attempting to use or access a cellular data network without having purchased access. The request may come from the data access server 160 on behalf of the mobile device 110. The request may include a context of the mobile device, such as what app is in the foreground, a location of the mobile device, what app was used previously, and so forth. The request may include information to identify the particular mobile device and/or the user.

The logic flow 1100 may access analyzed data for the client device and select one or more data service packages according to the analyzed data in block 1106. For example, the data package service 120 may select data service packages that apply to the originating app, to the app that is in the foreground, or to a group of apps that include the originating or foreground app. The data package service 120 may select data service packages that apply to the time of day of the request, or to data amounts associated with the apps used by the mobile device. The data package service 120 may select data service packages that provide discounts to shift the network usage to a less congested time or to sponsored or promoted data service packages. If there are no existing data service packages for the particular app, the data package service 120 may select data service packages that apply more generally to a time of day, a data amount, or to an amount of funds remaining in a user account. In some embodiments, the data package service 120 may generate and select data service packages specific to the mobile device and its historical use and current context.

The logic flow 1100 may present the selected one or more data service packages to the client device and receive a selection of a data service package, in block 1108. For example, the data package service 120 may transmit descriptive information about the selected data service packages, via the data access server 160, so that the descriptive information can be presented to a user as offers for selection at the mobile device 110. The descriptive information may be associated with a specific data service package, for example, with an identifier. The data package service 120 may subsequently receive, via the data access server 160, a selection of a specific data service package that the user has chosen to purchase.

The logic flow 1100 may coordinate payment for the client selected data service package in block 1110. For example, the data package service 120 may transfer funds from a user account to an operator of the cellular system 130. The data package service 120 may cause a third party payment system to transfer funds from a user account to operator of the cellular system 130.

The logic flow 1100 may generate a policy associated with the client selection in block 1112. For example, the data package service 120 may generate a policy in the form of a data structure that includes parameters, rules, definitions, or other descriptions of the circumstances under which the mobile device may access the cellular data network. The policy may be provided to the data access server 160 for enforcement.

Figure 12A:
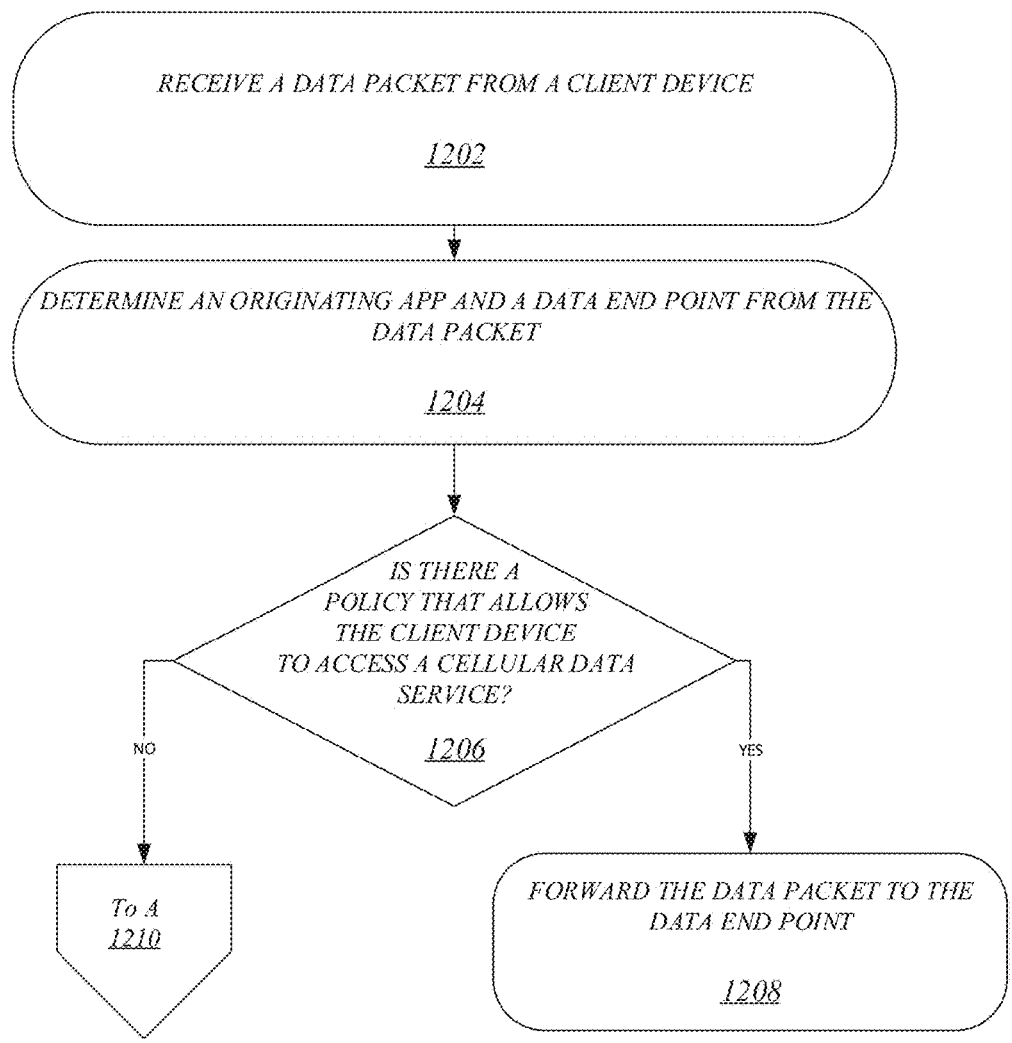
FIGS. 12A-B illustrate an embodiment of a fourth logic flow for the mobile data access system.
Figure 12B:
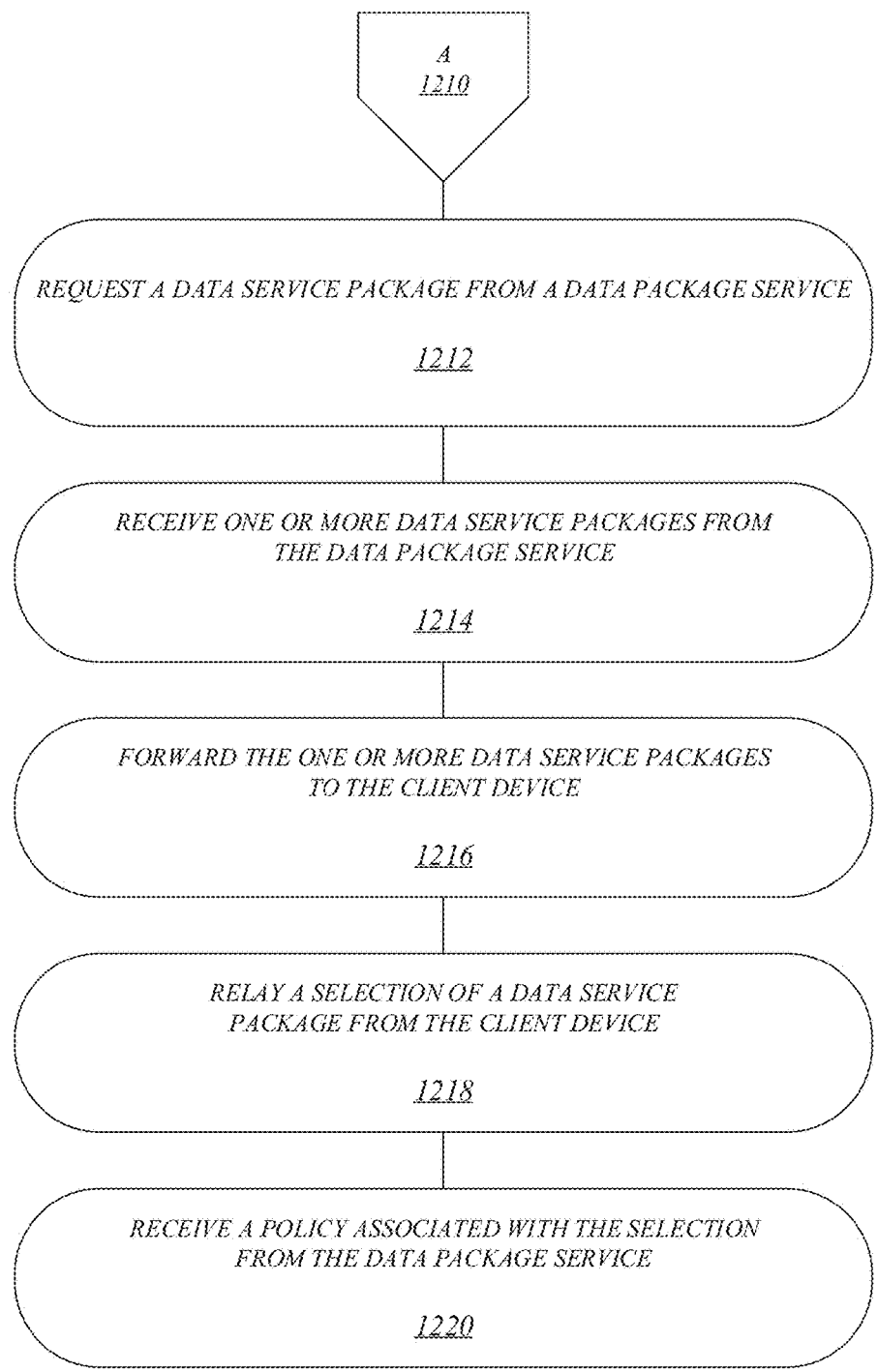

FIG. 12A-B illustrate one embodiment of a logic flow 1200. The logic flow 1200 may be representative of some or all of the operations executed by one or more embodiments described herein. In particular, the logic flow 1200 may illustrate operations performed by a data access server when it receives a network access event from a mobile device, and may describe some of the operations of block 1010 from the logic flow 1000.

Beginning in FIG. 12A, the logic flow 1200 may receive a network data packet from a client device in block 1202. For example, the data access server 160 may receive one or more network data packets sent by the data access app 220 on a mobile device 110.

The logic flow 1200 may determine an originating app and a data end point from the network data packet in block 1204. For example, the data access server 160 may read, decode, interpret, or otherwise examine, a tag placed on the network data packet by the data access app 220. The tag may identify the app that created the network data packet or the app that was in the foreground on the mobile device 110 when the network data packet was created. In some embodiments, the tag may further include an identifier for the mobile device and/or an identifier for the user. The data end point may be determined from an address in the network data packet, or a known data end point for the originating app.

The logic flow 1200 may determine, in block 1206, if there is a policy that allows the client device to access a cellular data network. For example, the data access server 160 may examine policies 470 in a policy store 450 to determine if there are any policies associated with the particular mobile device and/or the user. If there are such policies, the data access server 160 may determine whether any of those policies allow access to the cellular data network for the originating app.

When there is a policy that allows the access, the logic flow 1200 may forward the network data packet to the data end point in block 1208. When there is no policy that allows the access, the logic flow 1200 may proceed to block 1210.

Turning to FIG. 12B, from block 1210, the logic flow 1200 may request a data service package from a data package service in block 1212. In addition to requesting the data service package, the data access server 160 may provide in, or with, the request, a current context of the mobile device that sent the network data packet, and may also provide identifiers of the mobile device and/or the user.

The logic flow 1200 may receive one or more data service packages from the data package service in block 1214. For example, the data access server 160 may receive descriptions of various data service packages that the data package service 120 has selected for the user, context, and mobile device.

The logic flow 1200 may forward the one or more data service packages from the data package service to the client device in block 1216, and may relay a selection of a data service package from the client device to the data package service in block 1218. In various embodiments, the forwarding and receiving may take place using the cellular system 130, where the associated data transfers are "white-listed" by the cellular system 130.

The logic flow 1200 may receive a policy associated with the selection from the data package service, in block 1220. For example, the data access server 160 may receive and store a policy 470 that describes or defines the parameters under which the mobile device 110 is permitted to access the cellular data network of the cellular system 130.

Figure 13:
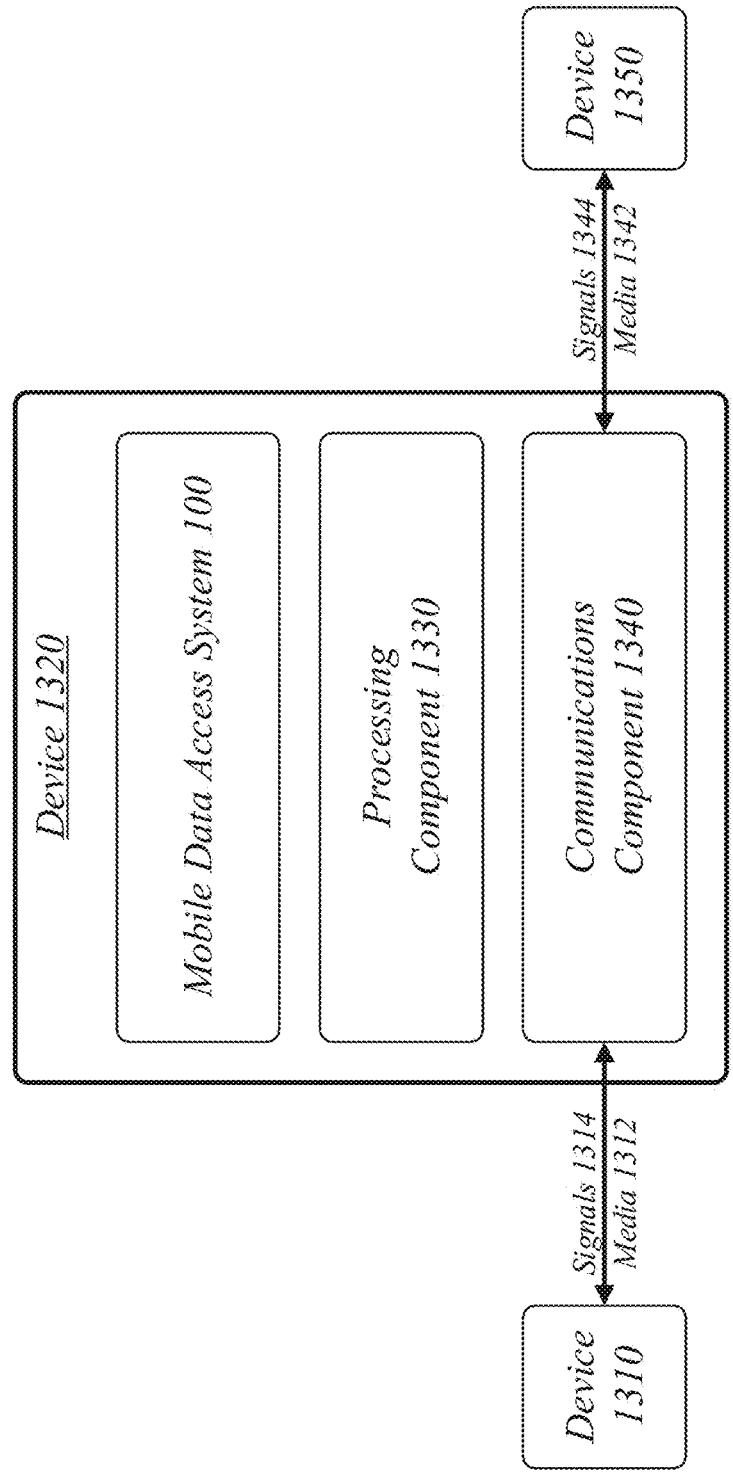
FIG. 13 illustrates an embodiment of a centralized system for the system of FIG. 1.

FIG. 13 illustrates a block diagram of a centralized system 1300. The centralized system 1300 may implement some or all of the structure and/or operations for the mobile data access system 100 in a single computing entity, such as entirely within a single device 1320.

The device 1320 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 1320 may execute processing operations or logic for the system 100 using a processing component 1330. The processing component 1330 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 1320 may execute communications operations or logic for the system 100 using communications component 1340. The communications component 1340 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1312, 1342 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1320 may communicate with other devices 1310, 1350 over a communications media 1312, 1342, respectively, using communications signals 1314, 1344, respectively, via the communications component 1340. The devices 1310, 1350 may be internal or external to the device 1320 as desired for a given implementation. The device 1310 may comprise a mobile device 110, a data end point 170, or components of the cellular system 130. The device 1350 may comprise a second data endpoint 170 or other components of the cellular system 130. The signals 1314 and 1344 may jointly carry data packets between a data access app 220 and a data end point 170.

Figure 14:
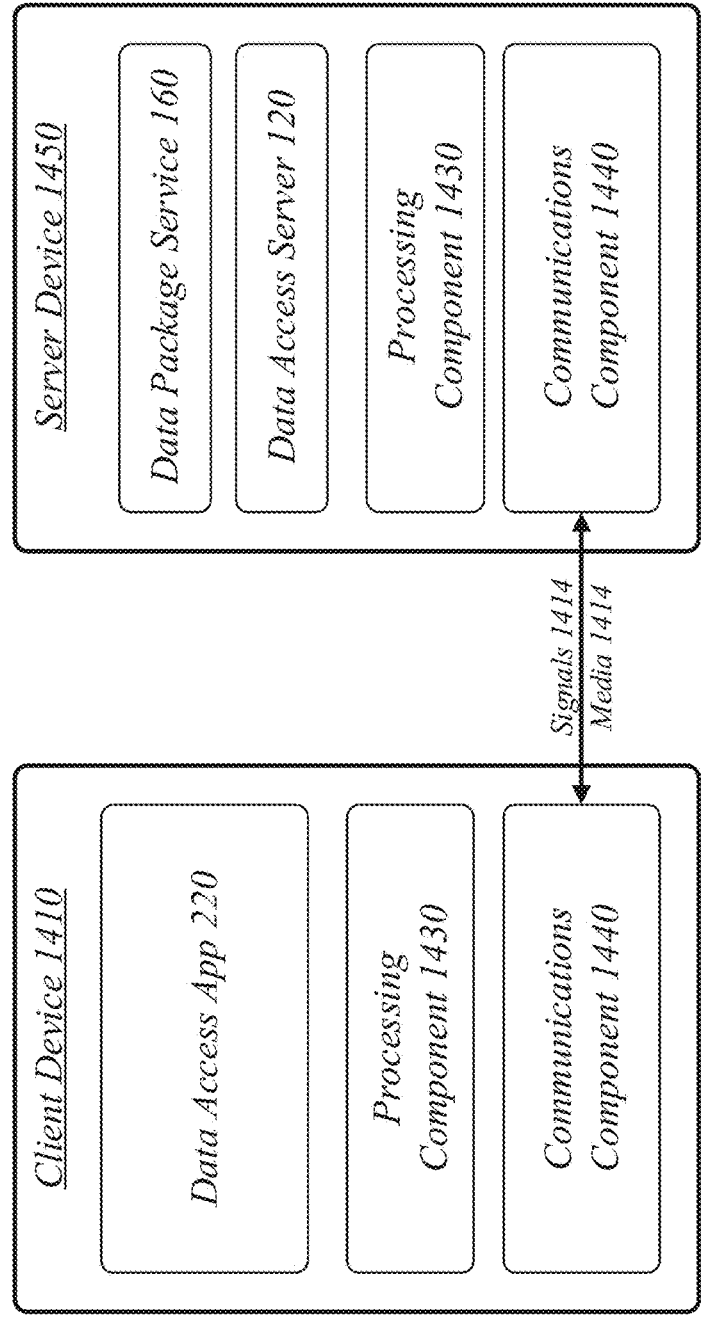
FIG. 14 illustrates an embodiment of a distributed system for the system of FIG. 1.

FIG. 14 illustrates a block diagram of a distributed system 1400. The distributed system 1400 may distribute portions of the structure and/or operations for the system 100 across multiple computing entities. Examples of distributed system 1400 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1400 may comprise a client device 1410 and a server device 1450. In general, the client device 1410 and the server device 1450 may be the same or similar to the client device 1320 as described with reference to FIG. 13. For instance, the client system 1410 and the server system 1450 may each comprise a processing component 1430 and a communications component 1440 which are the same or similar to the processing component 1330 and the communications component 1340, respectively, as described with reference to FIG. 13. In another example, the devices 1410, 1450 may communicate over a communications media 1412 using communications signals 1414 via the communications components 1440.

The client device 1410 may comprise or employ one or more client programs that operate to perform various methodologies in accordance with the described embodiments. In one embodiment, for example, the client device 1410 may implement the data access app 220.

The server device 1450 may comprise or employ one or more server programs that operate to perform various methodologies in accordance with the described embodiments. In one embodiment, for example, the server device 1450 may implement the data package service 120 and/or the data access server 160.

Figure 15:
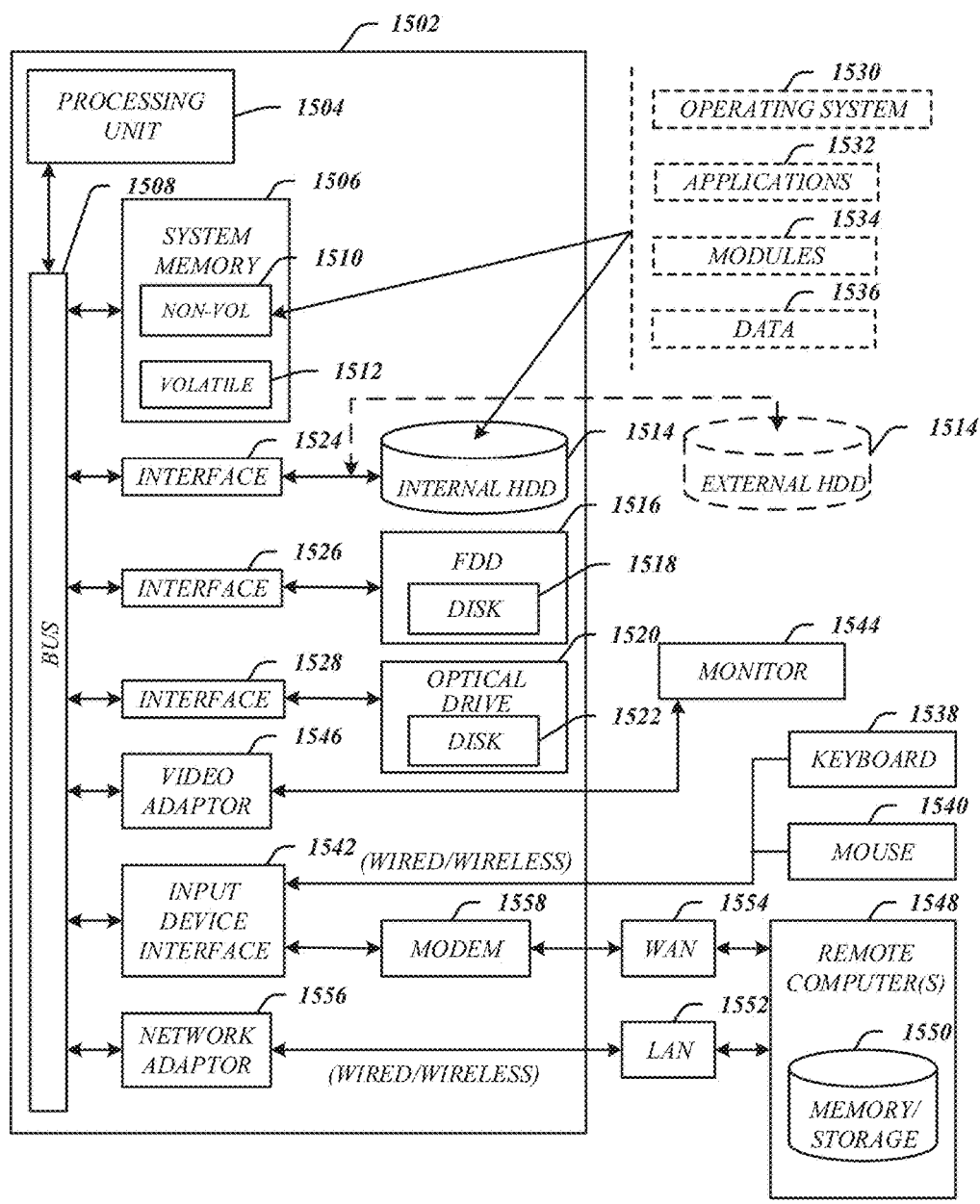
FIG. 15 illustrates an embodiment of a computing architecture.

FIG. 15 illustrates an embodiment of an exemplary computing architecture 1500 suitable for implementing various embodiments as previously described. In one embodiment, the computing architecture 1500 may comprise or be implemented as part of an electronic device. Examples of an electronic device may include those described with reference to FIG. 1, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1500 includes various common computing elements, such as one or more processors, multi-core processors, co-processors, memory units, chip-sets, controllers, peripherals, interfaces, oscillators, timing devices, video cards, audio cards, multimedia input/output (I/O) components, power supplies, and so forth. The embodiments, however, are not limited to implementation by the computing architecture 1500.

As shown in FIG. 15, the computing architecture 1500 comprises a processing unit 1504, a system memory 1506 and a system bus 1508. The processing unit 1504 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1504.

The system bus 1508 provides an interface for system components including, but not limited to, the system memory 1506 to the processing unit 1504. The system bus 1508 can be any of several types of bus structure that may further interconnect to a memory bus (with or without a memory controller), a peripheral bus, and a local bus using any of a variety of commercially available bus architectures. Interface adapters may connect to the system bus 1508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1500 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 15, the system memory 1506 can include non-volatile memory 1510 and/or volatile memory 1512. A basic input/output system (BIOS) can be stored in the non-volatile memory 1510.

The computer 1502 may include various types of computer-readable storage media in the form of one or more lower speed memory units, including an internal (or external) hard disk drive (HDD) 1514, a magnetic floppy disk drive (FDD) 1516 to read from or write to a removable magnetic disk 1518, and an optical disk drive 1520 to read from or write to a removable optical disk 1522 (e.g., a CD-ROM or DVD). The HDD 1514, FDD 1516 and optical disk drive 1520 can be connected to the system bus 1508 by a HDD interface 1524, an FDD interface 1526 and an optical drive interface 1528, respectively. The HDD interface 1524 for external drive implementations can include at least one or both of Universal Serial Bus (USB) and IEEE 1594 interface technologies.

The drives and associated computer-readable media provide volatile and/or nonvolatile storage of data, data structures, computer-executable instructions, and so forth. For example, a number of program modules can be stored in the drives and memory units 1510, 1512, including an operating system 1530, one or more application programs 1532, other program modules 1534, and program data 1536. In one embodiment, the one or more application programs 1532, other program modules 1534, and program data 1536 can include, for example, the various applications and/or components of the mobile data access system 100.

A user can enter commands and information into the computer 1502 through one or more wire/wireless input devices, for example, a keyboard 1538 and a pointing device, such as a mouse 1540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1504 through an input device interface 1542 that is coupled to the system bus 1508, but can be connected by other interfaces such as a parallel port, IEEE 1594 serial port, a game port, a USB port, an IR interface, and so forth.

A monitor 1544 or other type of display device is also connected to the system bus 1508 via an interface, such as a video adaptor 1546. The monitor 1544 may be internal or external to the computer 1502. In addition to the monitor 1544, a computer typically includes other peripheral output devices, such as speakers, printers, and so forth.

The computer 1502 may operate in a networked environment using logical connections via wire and/or wireless communications to one or more remote computers, such as a remote computer 1548. The remote computer 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wire/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the LAN 1552 through a wire and/or wireless communication network interface or adaptor 1556. The adaptor 1556 can facilitate wire and/or wireless communications to the LAN 1552, which may also include a wireless access point disposed thereon for communicating with the wireless functionality of the adaptor 1556.

When used in a WAN networking environment, the computer 1502 can include a modem 1558, or is connected to a communications server on the WAN 1554, or as other means for establishing communications over the WAN 1554, such as by way of the Internet. The modem 1558, which can be internal or external and a wire and/or wireless device, connects to the system bus 1508 via the input device interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with wire and wireless devices or entities using the IEEE 802 family of standards, such as wireless devices operatively disposed in wireless communication (e.g., IEEE 802.5 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.5x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 16:
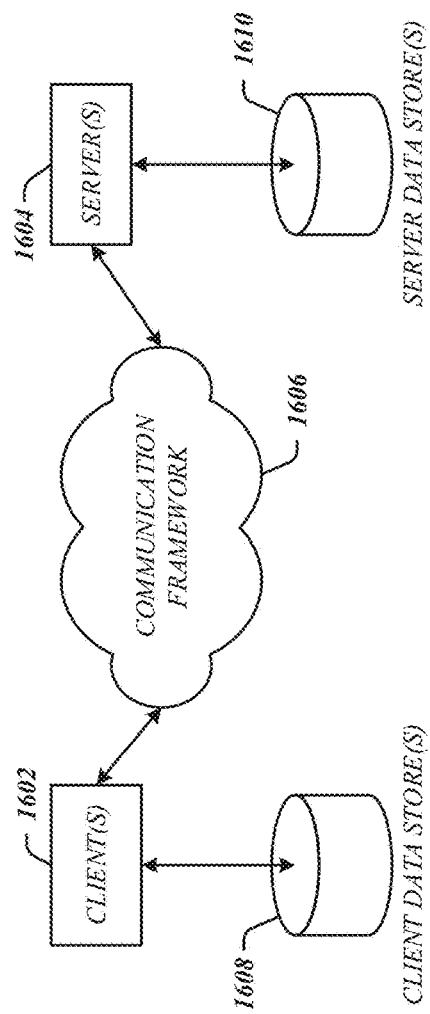
FIG. 16 illustrates an embodiment of a communications architecture.

FIG. 16 illustrates a block diagram of an exemplary communications architecture 1600 suitable for implementing various embodiments as previously described. The communications architecture 1600 includes various common communications elements, such as a transmitter, receiver, transceiver, radio, network interface, baseband processor, antenna, amplifiers, filters, power supplies, and so forth. The embodiments, however, are not limited to implementation by the communications architecture 1600.

As shown in FIG. 16, the communications architecture 1600 comprises includes one or more clients 1602 and servers 1604. The clients 1602 may implement a client device such as the mobile device 110. The servers 1604 may implement a server device such as the data access server 160 or the data package service 120. The clients 1602 and the servers 1604 are operatively connected to one or more respective client data stores 1608 and server data stores 1610 that can be employed to store information local to the respective clients 1602 and servers 1604, such as cookies and/or associated contextual information.

The clients 1602 and the servers 1604 may communicate information between each other using a communication framework 1606. The communications framework 1606 may implement any well-known communications techniques and protocols. The communications framework 1606 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1606 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1602 and the servers 1604. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 17:
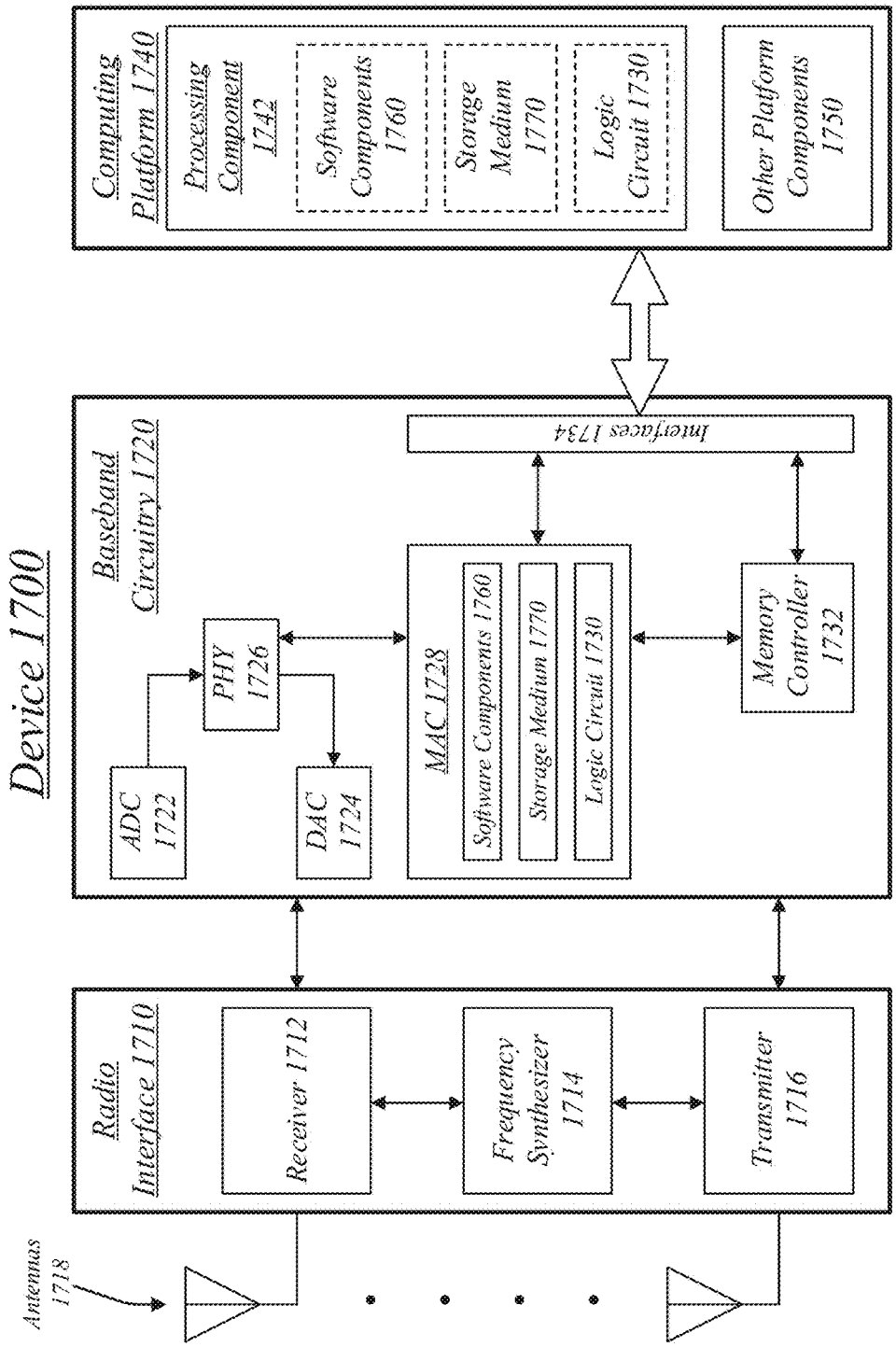
FIG. 17 illustrates an embodiment of a radio device architecture.

FIG. 17 illustrates an embodiment of a device 1700 for use in a multicarrier OFDM system, such as the mobile data access system 100. Device 1700 may implement, for example, software components 1760 as described with reference to mobile data access system 100 and/or a logic circuit 1730. The logic circuit 1730 may include physical circuits to perform operations described for the mobile data access system 100. As shown in FIG. 17, device 1700 may include a radio interface 1710, baseband circuitry 1720, and computing platform 1730, although embodiments are not limited to this configuration.

The device 1700 may implement some or all of the structure and/or operations for the mobile data access system 100 and/or logic circuit 1730 in a single computing entity, such as entirely within a single device. Alternatively, the device 1700 may distribute portions of the structure and/or operations for the mobile data access system 100 and/or logic circuit 1730 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1710 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1710 may include, for example, a receiver 1712, a transmitter 1716 and/or a frequency synthesizer 1714. Radio interface 1710 may include bias controls, a crystal oscillator and/or one or more antennas 1718. In another embodiment, radio interface 1710 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1720 may communicate with radio interface 1710 to process receive and/or transmit signals and may include, for example, an analog-to-digital converter 1722 for down converting received signals, a digital-to-analog converter 1724 for up converting signals for transmission. Further, baseband circuitry 1720 may include a baseband or physical layer (PHY) processing circuit 1756 for PHY link layer processing of respective receive/transmit signals. Baseband circuitry 1720 may include, for example, a processing circuit 1728 for medium access control (MAC)/ data link layer processing. Baseband circuitry 1720 may include a memory controller 1732 for communicating with processing circuit 1728 and/or a computing platform 1730, for example, via one or more interfaces 1734.

In some embodiments, PHY processing circuit 1726 may include a frame construction and/or detection module, in combination with additional circuitry such as a buffer memory, to construct and/or deconstruct communication frames, such as radio frames. Alternatively or in addition, MAC processing circuit 1728 may share processing for certain of these functions or perform these processes independent of PHY processing circuit 1726. In some embodiments, MAC and PHY processing may be integrated into a single circuit.

The computing platform 1730 may provide computing functionality for the device 1700. As shown, the computing platform 1730 may include a processing component 1740. In addition to, or alternatively of, the baseband circuitry 1720, the device 1700 may execute processing operations or logic for the mobile data access system 100 and logic circuit 1730 using the processing component 1740. The processing component 1740 (and/or PHY 1726 and/or MAC 1728) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1730 may further include other platform components 1750. Other platform components 1750 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1700 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1700 described herein, may be included or omitted in various embodiments of device 1700, as suitably desired. In some embodiments, device 1700 may be configured to be compatible with protocols and frequencies associated one or more of the 3GPP LTE Specifications and/or IEEE 802.16 Standards for WMANs, and/or other broadband wireless networks, cited herein, although the embodiments are not limited in this respect.

Embodiments of device 1700 may be implemented using single input single output (SISO) architectures. However, certain implementations may include multiple antennas (e.g., antennas 1718) for transmission and/or reception using adaptive antenna techniques for beamforming or spatial division multiple access (SDMA) and/or using MIMO communication techniques.

The components and features of device 1700 may be implemented using any combination of discrete circuitry, application specific integrated circuits (ASICs), logic gates and/or single chip architectures. Further, the features of device 1700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1700 shown in the block diagram of FIG. 17 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer implemented method may comprise collecting data by a data access app executing on a device. The data is about other apps used on the device. the method may include transmitting the collected data to a data package service and receiving one or more data service packages from the data package service. The method may include presenting the one or more data service packages in a user interface on the device; receiving a control directive selecting one of the one or more data service packages; and transmitting the selected data service package to the data package service. The method may include transmitting a data packet to a data end point according to the selected data service package.

The method may collect data about: which apps are used on the device; an amount of network data consumption of an app in use on the device; data end points accessed by an app; a sequence of apps used on the device; or frequency or duration of use of an app on the device. The collected data may be sent to a data package service periodically.

The method may include identifying, for a network access event, an app originating the network access event or a data end point of the network access event; and measuring an amount of network traffic requested or used by an app executing on the apparatus. The method may include attaching an identifier to a data packet, the identifier indicating an originating app of the data packet. The method may include identifying a first app as the originating app, when the first app uses a second app to access a data end point. The method may include mapping an app originating a network access event or an amount of network traffic to a specific data end point, process, or socket. A network access event comprises sending data or a request for data, or receiving data or a request for data, over a network by the device.

The method may include sending a network data packet to a data end point when the device is connected to a Wi-Fi network; and sending the network data packet to the data end point via a data access server using a cellular data network when the device is not connected to a Wi-Fi network.

The method may include presenting the user interface while an app other than the data access app is executing on the foreground on the device. The method may include presenting the user interface while an app other than the data access app is opened on the device.

The method may include registering a virtual private network (VPN) profile with an operating system executing on the device, wherein all network data packets are provided to the data access app prior to being transmitted on a network.

An apparatus may comprise a processor circuit; and a data access app operative on the processor circuit, comprising: a traffic mapper to identify, for a network access event, an app originating the network access event or a data end point of the network access event, and to measure an amount of network traffic requested or used by an app executing on the apparatus; a packet tagger to attach an identifier to a data packet, the identifier indicating an originating app of the data packet; and a packet router to send a data packet to a data end point when the apparatus is connected to a Wi-Fi network and to send the data packet to the data end point via a data access server using a cellular data network when the apparatus is not connected to a Wi-Fi network.

The data access app may include an offer component to: receive one or more data service packages from a data package service in response to a network access event; present the one or more data service packages in a user interface on the apparatus; receive a control directive selecting one of the one or more data service packages; and send the selected data service package to the data package service. The user interface is presented while the originating app is executing on the foreground on the apparatus, or when the originating app is opened on the apparatus.

The data access app comprises an app monitor to: collect data about what apps are used on the apparatus, a duration of use of apps on the apparatus, a time of day of use of apps on the apparatus, a sequence of apps used on the apparatus, or a frequency of use of an app on the apparatus. The app monitor sends the collected data to a data package service periodically. The data access app and an originating app are separate apps.

The traffic mapper sends data about the measured amount of network traffic to a data package service periodically. The traffic mapper identifies a first app as the originating app, when the first app uses a second app to access a data end point. The traffic mapper maps an app originating a network access event or an amount of network traffic to a specific data end point, process, or socket.

The data access app registers a virtual private network (VPN) profile with an operating system executing on the apparatus, wherein all network data packets are provided to the data access app prior to being transmitted on a network.

At least one computer-readable storage medium may comprising instructions that, when executed, cause an apparatus to: identify, for a network access event, an app originating the network access event; attach an identifier to a network data packet of the network access event, the identifier indicating an originating app of the network data packet; send a network data packet to a data end point when the apparatus is connected to a Wi-Fi network; and send the network data packet to the data end point via a data access server using a cellular data network when the apparatus is not connected to a Wi-Fi network.

The computer-readable storage medium may comprise instructions that when executed, cause the apparatus to: receive one or more data service packages from a data package service in response to a network access event; present the one or more data service packages in a user interface on the apparatus; receive a control directive selecting one of the one or more data service packages; and send the selected data service package to the data package service. The user interface may be presented while the originating app is executing on the foreground on the apparatus or when the originating app is opened on the apparatus.

The computer-readable storage medium may comprise instructions that when executed, cause the apparatus to: collect data about what apps are used on the apparatus, a duration of use of apps on the apparatus, a time of day of use of apps on the apparatus, a sequence of apps used on the apparatus, or a frequency of use of an app on the apparatus. The collected data may be sent to a data package service periodically.

The computer-readable storage medium may comprise instructions that when executed, cause the apparatus to: measure an amount of network traffic requested or used by an app executing on the apparatus; and send data about the measured amount of network traffic to a data package service periodically.

The computer-readable storage medium may comprise instructions that when executed, cause the apparatus to: identify a first app as the originating app, when the first app uses a second app to access a data end point.

The computer-readable storage medium may comprise instructions that when executed, cause the apparatus to: register a virtual private network (VPN) profile with an operating system executing on the apparatus, wherein all network data packets are provided to a data access app prior to being transmitted on a network.

A computer-implemented method may include receiving data at a data package service, wherein the data is about app use on one or more client devices; analyzing the data to obtain analyzed data; designing one or more data service packages according to the analyzed data, wherein a data service package defines one or more parameters for allowing access by a client device to a cellular data network; transmitting one or more data service packages to a client device; receiving a selection of a data service package from the client device; receiving payment for the selected data service package; and uploading a policy associated with the selected data service package to a data access server.

The method may include receiving data about: which apps on a client device are used; an amount of network data consumption of an app in use on a client device; data end points accessed by an app; a sequence of apps used on a client device; or frequency or duration of use of an app on a client device.

The method may include receiving operator data from a cellular data network operator; and designing one or more data service packages according to the operator data. The method may include receiving operator data including operator network capacity, operator network usage, or operator revenue targets.

The method may include designing a data service package including a price and a specified amount of data usage for an app. The method may include designing a data service package including a price and a specified amount of data usage for a duration of time by any app. The method may include designing a data service package including a price and a specified amount of data usage for a plurality of apps.

The method may include receiving a request from the data access server for a data service package for a client device; accessing the analyzed data for the client device; selecting one or more data service packages for the client device according to the analyzed data for the client device; and transmitting the selected one or more data service packages to the client device. The method may include receiving a device context with the request from the data access server; and selecting one or more data service packages for the client device according to at least one of the analyzed data for the client device or the device context.

The method may include analyzing the data to obtain: most used apps by duration of use; most frequently used apps; average data usage per app; other apps used in sequence with an app; or a time of day of use of an app.

The method may include designing one or more data service packages periodically; deleting one or more data service packages periodically; or modifying one or more data service packages periodically.

The method may include analyzing purchased data service packages for amount of use or revenue received; and modifying, deleting, or designing new data service packages according to the analyzing.

An apparatus may comprise a processor circuit; and a package generator component operative on the processor circuit to: receive analyzed data about app use on one or more client devices; and design one or more data service packages according to the analyzed data, wherein a data service package defines one or more parameters for allowing access by a client device to a cellular data network.

The apparatus may include an offer interface component operative on the processor circuit to: receive a request for a data service package for a client device; access analyzed data for the client device; select one or more data service packages for the client device according to the analyzed data for the client device; transmit the selected one or more data service packages to the client device; and receive a client selection of one of the one or more data service packages from the client device. the offer interface component may receive payment for the client selection; and generate a policy associated with the client selection and to forward the policy to a data access server. The policy associated with a data service package comprises parameters that define when the client device can use cellular data network.

The apparatus may comprise a client data analyzer operative on the processor circuit to: receive data about app use on one or more client devices; and analyze the data to obtain the analyzed data.

The apparatus may comprise an operator interface component operative on the processor circuit to receive operator data from a cellular data network operator. The package generator component may be operative to design one or more data service packages according to the operator data.

The offer interface component may be operative to receive a device context with the request for a data service package; and to select one or more data service packages for the client device according to at least one of the analyzed data for the client device or the device context. The device context includes what app is in the foreground on the client device at the time of the request, what data end point an app on the client device is attempting to access, or a time of day of the request.

At least one computer-readable storage medium may comprise instructions that, when executed, cause a system to: design one or more data service packages according to analyzed data about app use on one or more client devices; receive a request for a data service package for a client device; select one or more data service packages for the client device according to the analyzed data; transmit the selected one or more data service packages to the client device; receive a client selection of one of the one or more data service packages from the client device; receive payment for the client selection; and generate a policy associated with the client selection.

The computer-readable storage medium may comprise instructions that, when executed, cause the system to: receive data about app use on one or more client devices; and analyze the data to obtain the analyzed data.

The computer-readable storage medium may comprise instructions that, when executed, cause the system to: receive operator data from a cellular data network operator; and design one or more data service packages according to the operator data.

A policy associated with a data service package comprises parameters that define when the client device can use cellular data network.

The computer-readable storage medium may comprise instructions that, when executed, cause the system to: receive a device context with the request for a data service package; and select one or more data service packages for the client device according to at least one of the analyzed data for the client device or the device context.

The computer-readable storage medium may comprise instructions that, when executed, cause the system to: forward the policy to a data access server.

A computer-implemented method may comprise receiving a network data packet from a client device; determining an originating app and a data end point from the network data packet; determining whether a policy in a policy store allows the client device to access a cellular data network; and forwarding the network data packet to the data end point on the cellular data network when a policy does allow the access.

The method may comprise: requesting a data service package from a data package service when there is no policy that allows access by the client device; receiving one or more data service packages from the data package service; forwarding the one or more data service packages to the client device; receiving a selection of a data service package from the client device; forwarding the selection to the data package service; and receiving a policy associated with the selection from the data package service, where the policy defines parameters for when the client device can access the cellular data network.

The method may comprise including a device context with the request to the data package service, wherein the device context includes what app is in the foreground on the client device at the time the data packet is received, the data end point of the network data packet, or a time of day that the network data packet is received.

In the method, forwarding the network data packet to the data end point is rate-adjusted by an operator of the cellular data network.

The method may comprise determining the originating app from a tag in the network data packet.

The method may comprise determining the data end point from an address in the network data packet.

The method may comprise discarding the network data packet when there is no policy that allows access by the client device.

The method may comprise searching for a policy in the policy store that allows the client device to access the cellular data network for the originating app. The method may comprise searching for a policy in the policy store that allows the client device to access the cellular data network for a specified amount of data usage. The method may comprise searching for a policy in the policy store that allows the client device to access the cellular data network for a duration of time. The method may comprise searching for a policy in the policy store that allows the client device to access the cellular data network for a time of day.

An apparatus may comprise a processor circuit; and a tag decoder operative on the processor circuit to: receive a network data packet from a client device; and determine an originating app and a data end point from the network data packet.

The apparatus may comprise a policy enforcer operative on the processor circuit to determine whether a policy in a policy store allows the client device to access a cellular data network; and a network component operative on the processor circuit to forward the network data packet to the data end point via the cellular data network when a policy does allow the access.

The apparatus may comprise an offer coordinator operative on the processor circuit to: request a data service package from a data package service when there is no policy that allows access by the client device; receive one or more data service packages from the data package service; forward the one or more data service packages to the client device; receive a selection of a data service package from the client device; forward the selection to the data package service; and receive a policy associated with the selection from the data package service, where the policy defines parameters for when the client device can access a cellular data network. The offer coordinator may be operative to store a received policy in the policy store.

The tag decoder may be operative to: determine the originating app from a tag in the network data packet and to determine the data end point from an address in the network data packet.

The policy enforcer may be operative to discard the network data packet when there is no policy that allows access by the client device.

The policy enforcer operative to search for a policy in the policy store that allows the client device to access the cellular data network for the originating app; that allows the client device to access the cellular data network for a specified amount of data usage; that allows the client device to access the cellular data network for a duration of time; or that allows the client device to access the cellular data network for a time of day.

Communication between the network component and the cellular data network may be rate-adjusted.

At least one computer-readable storage medium may comprising instructions that, when executed, cause an apparatus to: receive a network data packet from a client device; determine an originating app and a data end point from the network data packet; determine whether a policy in a policy store allows the client device to access a cellular data network; and forward the network data packet to the data end point via the cellular data network when a policy does allow the access.

The computer-readable storage medium of may comprise instructions that when executed, cause the apparatus to: request a data service package from a data package service when there is no policy that allows access by the client device; receive one or more data service packages from the data package service; forward the one or more data service packages to the client device; receive a selection of a data service package from the client device; forward the selection to the data package service; and receive a policy associated with the selection from the data package service, where the policy defines parameters for when the client device can access a cellular data network. The instructions may cause the apparatus to store a received policy in the policy store.

The computer-readable storage medium of may comprise instructions that when executed, cause the apparatus to: determine the originating app from a tag in the network data packet.

The computer-readable storage medium of may comprise instructions that when executed, cause the apparatus to: determine the data end point from an address in the network data packet.

The computer-readable storage medium of may comprise instructions that when executed, cause the apparatus to: discard the network data packet when there is no policy that allows access by the client device.

The computer-readable storage medium of may comprise instructions that when executed, cause the apparatus to: search for a policy in the policy store that allows the client device to access the cellular data network for the originating app.

The computer-readable storage medium of may comprise instructions that when executed, cause the apparatus to: search for a policy in the policy store that allows the client device to access the cellular data network for a specified amount of data usage.

The computer-readable storage medium of may comprise instructions that when executed, cause the apparatus to: search for a policy in the policy store that allows the client device to access the cellular data network for a duration of time.

The computer-readable storage medium of may comprise instructions that when executed, cause the apparatus to: search for a policy in the policy store that allows the client device to access the cellular data network for a time of day.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:
1. A computer-implemented method, comprising:
receiving application usage data at a data package service;
analyzing the application usage data to obtain analyzed data;
dynamically designing one or more data service packages according to the analyzed data, each data service package to define a set of parameters to manage access to a cellular data network, the dynamically designing performed by the data package service that is distinct from a client device that originated the application usage data, the dynamically designing comprising:
designing a data service package including a specified amount of data usage for an application;
designing a data service package including a specified amount of data usage for a duration of time by any application; or
designing a data service package including a specified amount of data usage for a plurality of applications;
transmitting, from the data package service, one or more data service packages to the client device distinct from the data package service;
receiving a selection of a data service package from the client device; and
uploading a policy associated with the selected data service package to a data access server, the uploading causing the data access server to provide access to data according to the data service package.

2. The method of claim 1, the application usage data to comprise an application identifier parameter, a network usage parameter, a data endpoint parameter, an application sequence parameter, a frequency parameter, or a duration parameter.

3. The method of claim 1, comprising:
receiving operator data from a cellular data network operator; and
designing one or more data service packages according to the operator data.

4. The method of claim 1, comprising:
receiving a request from the data access server for a data service package for a client device;
accessing the analyzed data for the client device;
selecting one or more data service packages for the client device according to the analyzed data for the client device; and
transmitting the selected one or more data service packages to the client device.

5. The method of claim 4, comprising:
receiving a device context with the request from the data access server; and
selecting one or more data service packages for the client device according to at least one of the analyzed data for the client device or the device context.

6. The method of claim 1, the analyzed data to comprise a determination of an application used by a highest number of client devices, an application used for a longest average duration by a plurality of client devices, an average amount of network data usage per application across a plurality of client devices, a set of other applications used in sequence with an application on a plurality of client devices, or a common time of day of use of an application across a plurality of client devices.

7. An apparatus, comprising:
a processor circuit;
a memory for storing one or more components for execution by the processor circuit;
a data package service for execution by the processor circuit to generate data service packages for client devices, the data package service comprising:

a client data analyzer component to receive application usage data from a set of client devices and analyze the application usage data;

a package generator component to dynamically design one or more data service packages based on the analyzed data, each data service package to define a set of parameters to manage access to a cellular data network, the dynamically designing performed by the data package service that is distinct from set of the client devices that originated the application usage data, the dynamically designing comprising:

designing a data service package including a specified amount of data usage for an application;

designing a data service package including a specified amount of data usage for a duration of time by any application; or designing a data service package including a specified amount of data usage for a plurality of applications; and an offer interface component to receive a request for access to the cellular data network by a client device, transmit, from the data package service, a set of data service packages to the client device distinct from the data package service in response to the request, receive a data service package selection, and send a policy to a data access server to allow the client device to access the cellular data network in accordance with the data service package selection.

8. The apparatus of claim 7, comprising:

an operator interface component operative on the processor circuit to receive operator data from a cellular data network operator; and the package generator component operative to design one or more data service packages according to the operator data.

9. The apparatus of claim 7, wherein a policy associated with a data service package comprises parameters that define when the client device can access the cellular data network.

10. The apparatus of claim 9, wherein a policy parameter specifies an application that can access the cellular data network, a group of applications that can access the cellular data network, a duration of access, a time of day of access, an amount of data transfer, or a day of the week of access.

11. The apparatus of claim 7, the offer interface component operative to receive a device context with the request for a data service package; and to select one or more data service packages for the client device according to at least one of the analyzed data for the client device or the device context.

12. The apparatus of claim 11, wherein the device context includes what application is in the foreground on the client device at the time of the request, what data end point an application on the client device is attempting to access, or a time of day of the request.

13. At least one non-transitory computer-readable storage medium comprising instructions that, when executed, cause a system to:

dynamically design one or more data service packages according to analyzed data about application use on one or more client devices, the dynamically designing performed by a data package service that is distinct from the one or more client devices that originated the application usage data, the dynamically designing comprising:

designing a data service package including a specified amount of data usage for an application;

designing a data service package including a specified amount of data usage for a duration of time by any application; or designing a data service package including a specified amount of data usage for a plurality of applications;

select one or more data service packages for the client device according to the analyzed data;

transmit, from the data package service the selected one or more data service packages to a client device distinct from the data package service;

receive a client selection of one of the one or more data service packages from the client device;

generate a policy associated with the client selection; and cause the system to forward the policy to a data access server to allow the client device to access a cellular data network in accordance with the data service package selection.

14. The non-transitory computer-readable storage medium of claim 13, comprising instructions that, when executed, cause the system to:

receive application usage data from one or more client devices; and analyze the data to obtain the analyzed data.

15. The non-transitory computer-readable storage medium of claim 13, comprising instructions that, when executed, cause the system to:

receive operator data from a cellular data network operator; and design one or more data service packages according to the operator data.

16. The non-transitory computer-readable storage medium of claim 13, wherein a policy associated with a data service package comprises parameters that define when the client device can access a cellular data network.

17. The non-transitory computer-readable storage medium of claim 13, comprising instructions that, when executed, cause the system to:

receive a request for a data service package and a device context for a client device; and select one or more data service packages for the client device according to at least one of the analyzed data for the client device or the device context.

* * * * *